(12) United States Patent
Asano

(10) Patent No.: US 10,991,090 B2
(45) Date of Patent: Apr. 27, 2021

(54) GAS DETECTION-USE IMAGE PROCESSING DEVICE, GAS DETECTION-USE IMAGE PROCESSING METHOD, AND GAS DETECTION-USE IMAGE PROCESSING PROGRAM

(71) Applicant: KONICA MINOLTA, INC., Tokyo (JP)

(72) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 28 days.

(21) Appl. No.: 16/466,267

(22) PCT Filed: Oct. 10, 2017

(86) PCT No.: PCT/JP2017/036579
§ 371 (c)(1),
(2) Date: Jun. 3, 2019

(87) PCT Pub. No.: WO2018/123196
PCT Pub. Date: Jul. 5, 2018

(65) Prior Publication Data
US 2020/0065953 A1    Feb. 27, 2020

(30) Foreign Application Priority Data
Dec. 27, 2016    (JP) .............................. JP2016-252269

(51) Int. Cl.
*G06T 7/00* (2017.01)
*G01M 3/38* (2006.01)
(Continued)

(52) U.S. Cl.
CPC ............... *G06T 7/001* (2013.01); *G01M 3/38* (2013.01); *G06K 9/3233* (2013.01);
(Continued)

(58) Field of Classification Search
CPC .................................. H04N 5/332; G01J 3/51
(Continued)

(56) References Cited

U.S. PATENT DOCUMENTS 6,133,569 A * 10/2000 Shoda ..................... G01J 5/061
250/330
2011/0293179 A1* 12/2011 Dikmen .................. G06T 5/008
382/167
(Continued)

FOREIGN PATENT DOCUMENTS

| JP | 2007263829 A | 10/2007 |
| JP | 2012058093 A | 3/2012 |
| JP | 2016206139 A | 12/2016 |

OTHER PUBLICATIONS

International Search Report (and English translation thereof) dated Nov. 21, 2017 issued in International Application No. PCT/JP2017/036579.
(Continued)

*Primary Examiner* — Kiet M Doan
(74) *Attorney, Agent, or Firm* — Holtz, Holtz & Volek PC

(57) ABSTRACT

A gas detection-use image processing device includes a first processing part that acquires a first image including a first region image indicating a region where a gas candidate has appeared, extracted from an infrared image, on each of a plurality of infrared images captured in time series in a predetermined period to acquire a plurality of first images. The gas detection-use image processing device also includes a second processing part that generates a second image including a second region image in at least a part of the predetermined period, by using the plurality of first images. The first processing part acquires first images in each of at least two predetermined periods. The second processing part generates at least two second images. The gas detection-use image processing device further includes a calculation part that calculates similarity of the at least two second images.

18 Claims, 22 Drawing Sheets

(51) Int. Cl.
 *G06K 9/32* (2006.01)
 *G06K 9/62* (2006.01)
(52) U.S. Cl.
 CPC ......... *G06K 9/6202* (2013.01); *G06K 9/6215* (2013.01); *G06T 2207/10016* (2013.01); *G06T 2207/10048* (2013.01); *G06T 2207/30108* (2013.01)
(58) Field of Classification Search
 USPC ................................. 348/160, 164, 143, 159
 See application file for complete search history.

(56) References Cited

U.S. PATENT DOCUMENTS

| | | |
|---|---|---|
| 2014/0002639 A1 | 1/2014 | Cheben et al. |
| 2015/0220777 A1* | 8/2015 | Kauffmann .......... H04N 5/2621 382/103 |
| 2016/0284075 A1* | 9/2016 | Phan .................. G06K 9/00664 |
| 2016/0320296 A1 | 11/2016 | Asano et al. |
| 2018/0350053 A1* | 12/2018 | Sugaya .................. G06T 7/001 |

OTHER PUBLICATIONS

Written Opinion of the International Search Authority dated Nov. 21, 2017 issued in International Application No. PCT/JP2017/036579.

\* cited by examiner

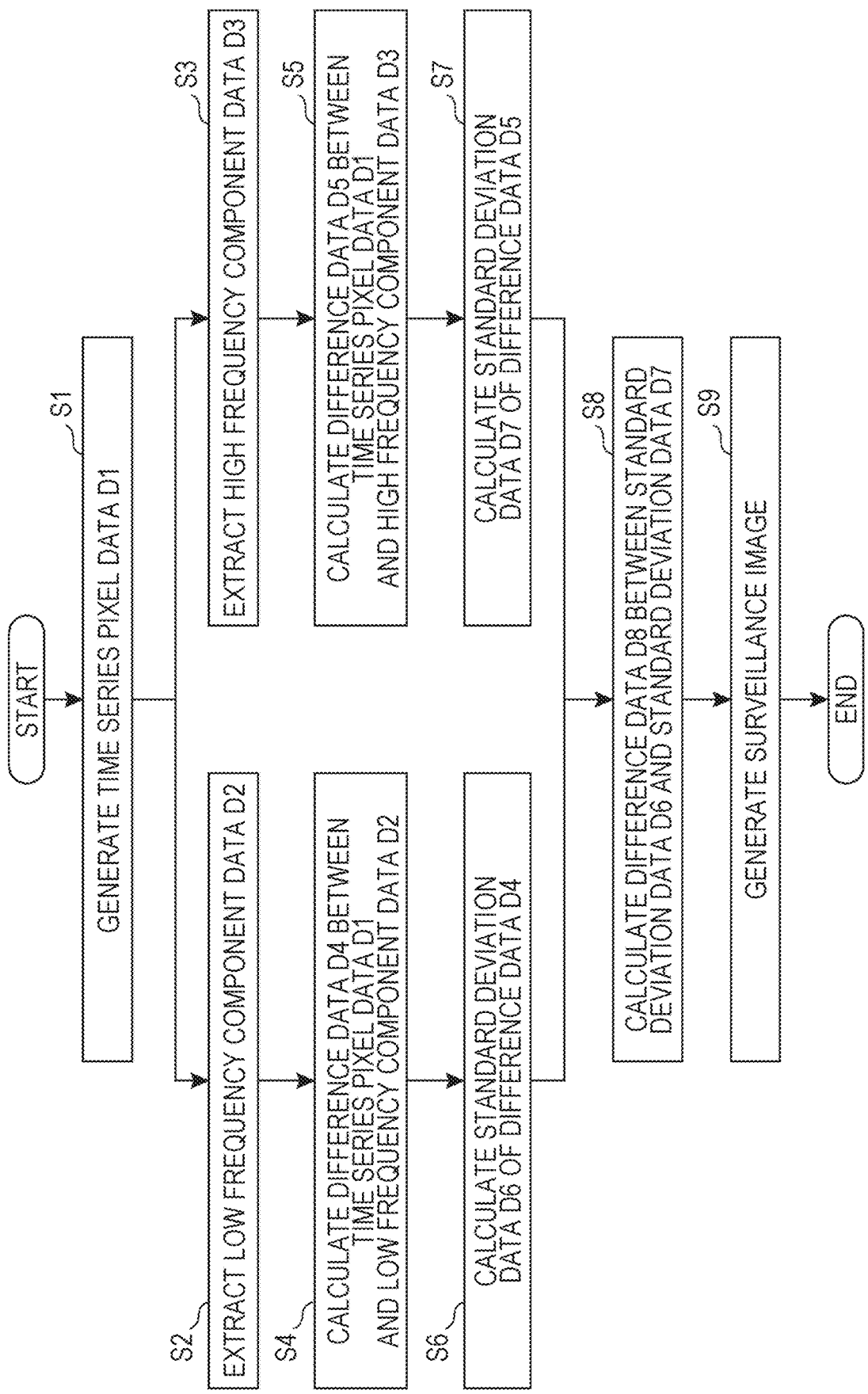

102

GAS DETECTION-USE IMAGE PROCESSING DEVICE, GAS DETECTION-USE IMAGE PROCESSING METHOD, AND GAS DETECTION-USE IMAGE PROCESSING PROGRAM

TECHNICAL FIELD

The present invention relates to a technology for detecting a gas by using an infrared image.

BACKGROUND ART

When a gas leak occurs, a slight temperature change occurs in a region where the leaked gas is in the air. As a technology for detecting a gas by using this principle, there is known a gas detection using an infrared image.

For example, as the gas detection using an infrared image, Patent Literature 1 discloses a gas leak detection device including: an infrared camera that captures an image of a region of an inspected object, and an image processing unit that processes an infrared image captured by the infrared camera, in which the image processing unit includes a fluctuation extracting unit that extracts dynamic fluctuation due to a gas leak from a plurality of infrared images arranged in time series.

At a place (such as a gas plant) where a gas detection is to be performed, there is an object to be a reflective surface (such as a tower and piping). The reflective surface reflects heat from a heat source or reflects light from a light source (the sun). The inventor has found that false detection of a gas occurs in the following cases.

(1) Steam or the like exists in the middle of an area from the heat source to a reflective surface.

(2) Steam or the like exists in the middle of an area from the light source to a reflective surface.

(3) Even if steam or the like does not exist in the middle of the area from the heat source to the reflective surface, the heat source fluctuates, and heat from this heat source is reflected on the reflective surface.

(4) Even if steam or the like does not exist in the middle of the area from the light source to the reflective surface, the light source fluctuates, and light from this light source is reflected on the reflective surface.

For example, in a case where steam exists in the middle of the area from the light source to the reflective surface, a shadow of the steam projected on the reflective surface is photographed as a gas in the infrared image. Once the light source fluctuates, the fluctuation of the light source is photographed in the infrared image as if a gas fluctuated. For example, there is a case where the reflective surface is a curved surface and a cloud moves, as a condition under which fluctuation occurs. That is, once the cloud moves to block sunlight or the cloud that blocks sunlight moves, an amount of light striking the reflective surface changes and the apparent temperature changes, causing fluctuations.

CITATION LIST

Patent Literature

Patent Literature 1: JP 2012-58093 A

SUMMARY OF INVENTION

An object of the present invention is to provide a gas detection-use image processing device, a gas detection-use image processing method, and a gas detection-use image processing program that enable an improvement of the accuracy of gas detection.

In order to achieve the aforementioned object, a gas detection-use image processing device reflecting one aspect of the present invention includes a first processing unit, a second processing unit, and a calculation unit. The first processing unit performs first processing of acquiring a first image including a first region image indicating a region where a gas candidate has appeared, extracted from a predetermined region of an infrared image, on each of a plurality of the infrared images captured in time series in a predetermined period to acquire a plurality of the first images. The second processing unit performs second processing of generating a second image including a second region image indicating a region where the gas candidate has appeared in at least a part of the predetermined period, by using the plurality of first images. The first processing unit performs the first processing on the plurality of infrared images captured in time series in each of two or more of the predetermined periods. The second processing unit performs the second processing on the plurality of first images generated corresponding to each of the two or more predetermined periods to generate two or more of the second images. The calculation unit calculates similarity of the two or more second images.

Advantages and features are provided according to one or more embodiments of the invention, which will be more fully understood from detailed descriptions as below and accompanying drawings. These detailed descriptions and the accompanying drawings are provided only by way of an example and are not intended as definition to limit the present invention.

BRIEF DESCRIPTION OF DRAWINGS

FIG. 5 is a flowchart for describing processing of generating a surveillance image.

DESCRIPTION OF EMBODIMENTS

Hereinafter, one or more embodiments of the present invention will be described with reference to the drawings. However, the scope of the invention is not limited to the disclosed embodiments.

In each figure, a component denoted by the same reference sign indicates the same component and the description thereof will not be repeated. Herein, components are generally denoted by the respective reference signs without indices (for example, the first image 1I) and are particularly denoted by the respective reference signs with indices (for example, a first image 1I-1).

Figure 1A:
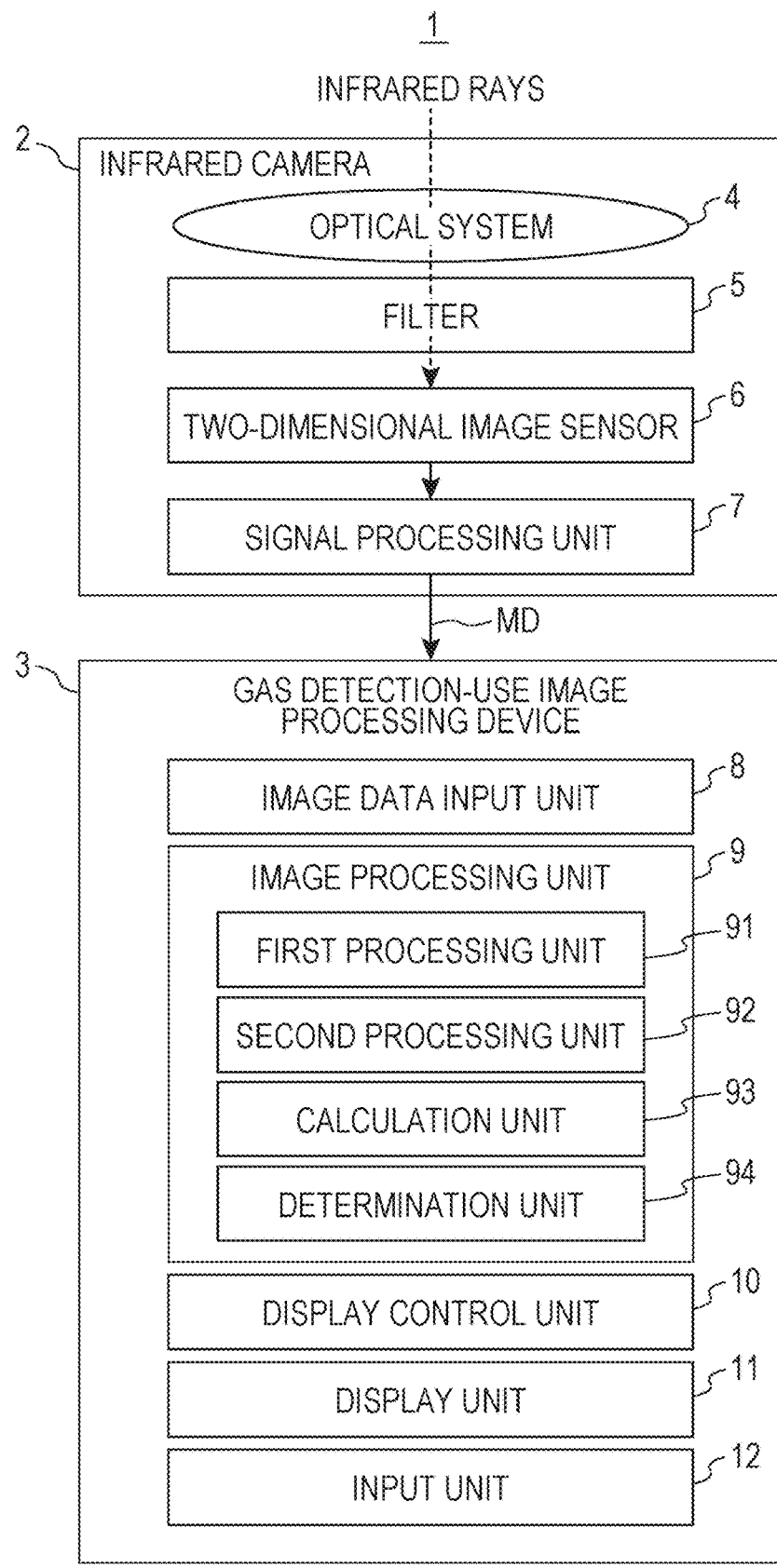
FIG. 1A is a block diagram illustrating a configuration of a gas detection system according to an embodiment.

FIG. 1A is a block diagram illustrating a configuration of a gas detection system 1 according to an embodiment. The gas detection system 1 includes an infrared camera 2 and a gas detection-use image processing device 3.

The infrared camera 2 captures a dynamic image of infrared images of a subject including a surveillance object (for example, a position where a gas transport pipes are connected) of a gas leak, and generates dynamic image data MD indicating the dynamic image. The dynamic image data MD may be a plurality of infrared images captured in time series, and is not limited to the dynamic image. The infrared camera 2 includes an optical system 4, a filter 5, a two-dimensional image sensor 6, and a signal processing unit 7.

The optical system 4 forms an infrared image of the subject on the two-dimensional image sensor 6. The filter 5 is disposed between the optical system 4 and the two-dimensional image sensor 6 and passes only infrared rays of a specific wavelength out of the light passing through the optical system 4. Out of a wavelength range of the infrared, a wavelength range for passing through the filter 5 depends on a type of a gas to be detected. For example, in a case of methane, a filter 5 for passing a wavelength range of 3.2 to 3.4 μm is used. The two-dimensional image sensor 6 is, for example, a cooled indium antimony (InSb) image sensor, and receives infrared rays that have passed through the filter 5. The signal processing unit 7 converts an analog signal output from the two-dimensional image sensor 6 into a digital signal, and performs known image processing. This digital signal is dynamic image data MD.

The gas detection-use image processing device 3 is a personal computer, a smartphone, a tablet terminal or the like, and includes an image data input unit 8, an image processing unit 9, a display control unit 10, a display unit 11, and an input unit 12 as functional blocks.

The image data input unit 8 is a communication interface for communicating with a communication unit (not illustrated) of the infrared camera 2. The dynamic image data MD sent from the communication unit of the infrared camera 2 is input to the image data input unit 8. The image data input unit 8 sends the dynamic image data MD to the image processing unit 9.

The image processing unit 9 is implemented by a Central Processing Unit (CPU), a Random Access Memory (RAM), a Read Only Memory (ROM), a Hard Disk Drive (HDD) or the like, and performs predetermined processing on the dynamic image data MD. For example, the predetermined processing is the processing of generating time series pixel data from the dynamic image data MD.

Figure 2:
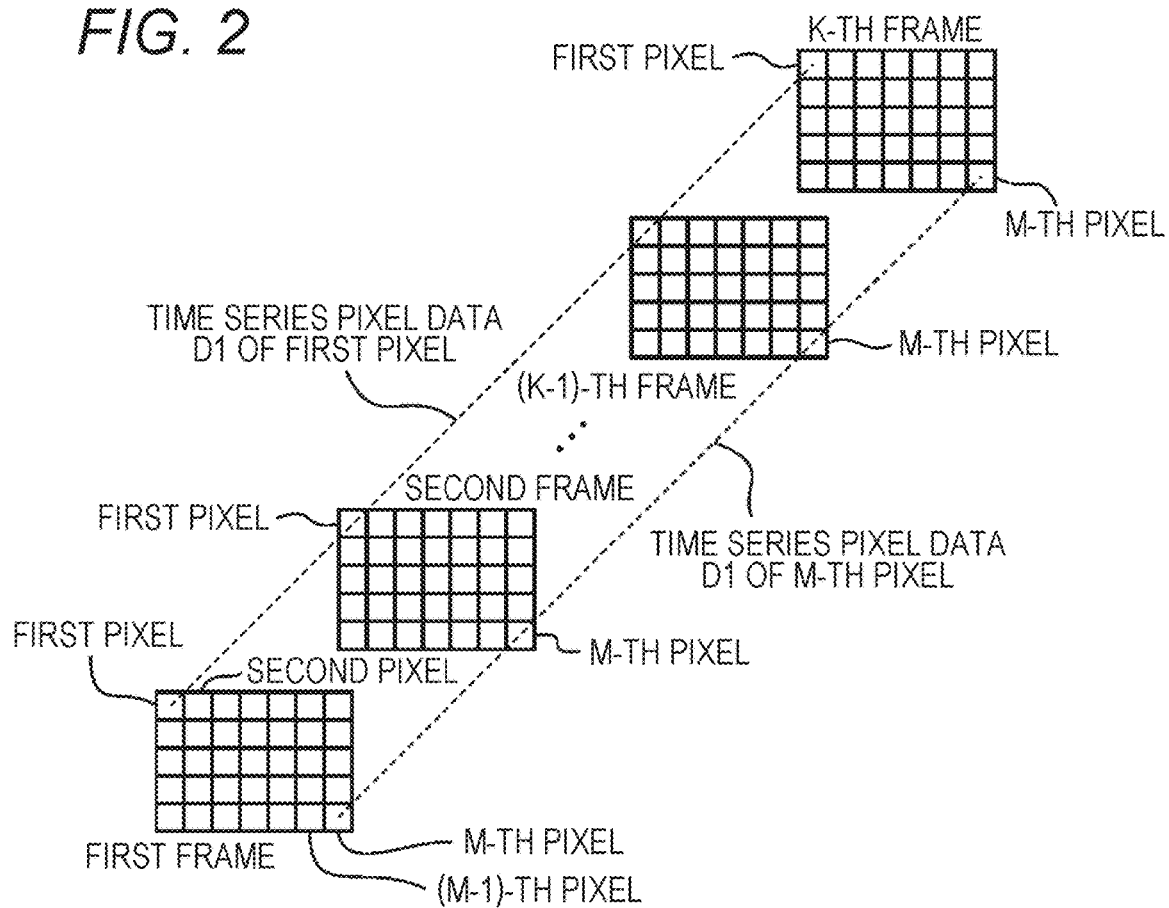
FIG. 2 is an explanatory view for describing time series pixel data D1.

The time series pixel data will be specifically described. FIG. 2 is an explanatory view for describing the time series pixel data D1. The dynamic image indicated by the dynamic image data MD has a structure in which a plurality of frames is arranged in time series. Data in which pixel data of pixels at the same positions in a plurality of frames (a plurality of infrared images) are arranged in time series is set as time series pixel data D1. The number of the dynamic image of these infrared images is set to K. One frame is configured with an M number of pixels, that is, a first pixel, a second pixel, and, . . . , an (M−1)-th pixel, and an M-th pixel. Physical quantities such as luminance and temperature are determined based on pixel data (pixel values).

The pixels at the same positions of a plurality of frames (a K number of frames) mean pixels in the same order. For example, it is described based on the first pixel that data obtained by arranging pixel data of the first pixel included in a first frame, pixel data of the first pixel included in a second frame, and, . . . , pixel data of the first pixel included in a (K−1)-th frame, and pixel data of the first pixel included in a K-th frame in time series is set as time series pixel data D1 of the first pixel. Also, it is described based on the M-th pixel that data obtained by arranging pixel data of the M-th pixel included in the first frame, pixel data of the M-th pixel included in the second frame, and, . . . , pixel data of the M-th pixel included in the (K−1)-th frame, and pixel data of the M-th pixel included in the K-th frame in time series is set as time series pixel data D1 of the M-th pixel. The number of time series pixel data D1 is the same as the number of pixels configuring one frame.

With reference to FIG. 1A, an image processing unit 9 includes a first processing unit 91, a second processing unit 92, a calculation unit 93, and a determination unit 94. These will be described later.

The display control unit 10 is implemented by a CPU, a RAM, a ROM, an HDD, and the like, and causes the display unit 11 to display an image or the like indicated by the dynamic image data MD. The display unit 11 is implemented by, for example, a liquid crystal display.

The input unit 12 is implemented by a keyboard, a touch panel or the like, and receives various types of inputs related to gas detection. Although the gas detection-use image processing device 3 according to the embodiment includes the display control unit 10, the display unit 11, and the input unit 12, the gas detection-use image processing device 3 which does not include these units may be used.

Figure 1B:
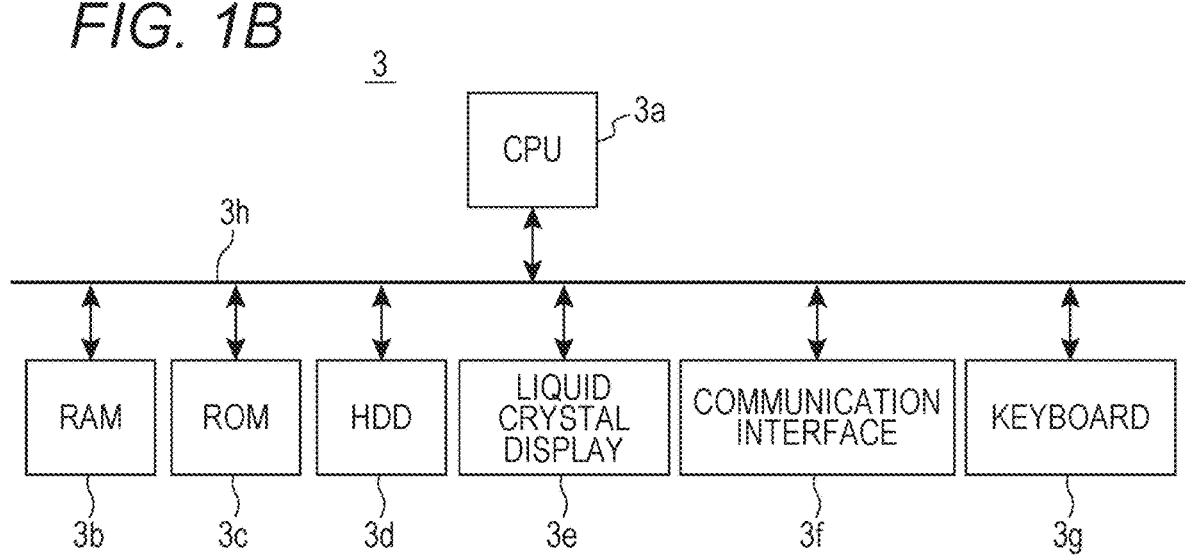
FIG. 1B is a block diagram illustrating a hardware configuration of the gas detection-use image processing device illustrated in FIG. 1A.

FIG. 1B is a block diagram illustrating a hardware configuration of the gas detection-use image processing device 3 illustrated in FIG. 1A. The gas detection-use image processing device 3 includes a CPU 3a, a RAM 3b, a ROM 3c, an HDD 3d, a liquid crystal display 3e, a communication interface 3f a keyboard 3g, and a bus 3h for connecting these components. The liquid crystal display 3e is hardware that implements the display unit 11. Instead of the liquid crystal display 3e, an organic EL display (Organic Light Emitting Diode display), a plasma display or the like may be used. The communication interface 3f is hardware that implements the image data input unit 8. The keyboard 3g is hardware that implements the input unit 12.

The HDD 3d stores programs for implementing the image processing unit 9 and the display control unit 10 as the functional blocks, respectively. The program for implementing the image processing unit 9 is a processing program that acquires the dynamic image data MD and performs the predetermined processing on the dynamic image data MD. The program for implementing the display control unit 10 is a display control program for causing the display unit 11 to display an image (for example, the dynamic image indicated by the dynamic image data MD). These programs may be stored in the ROM 3c instead of the HDD 3d.

The CPU 3a reads out the processing program and the display control program from the HDD 3d, develops the processing program and the display control program in the RAM 3b, and executes the developed program to implement these functional blocks. Although the processing program and the display control program are stored in advance in the HDD 3d, the present invention is not limited thereto. For example, a recording medium (for example, an external recording medium such as a magnetic disk or an optical disk) recording these programs may be prepared, and the programs stored in this recording medium may be stored in the HDD 3d. Also, these programs may be stored in a server connected to the gas detection-use image processing device 3 through a network, and these programs may be sent to the HDD 3d through the network and stored in the HDD 3d.

Incidentally, in the gas detection-use image processing device 3, there are provided a first aspect to third aspect as described below. Each of these aspects is configured with a plurality of elements. Therefore, a program for implementing these elements is stored in the HDD 3d. For example, the first aspect of the gas detection-use image processing device 3 includes, as elements, the first processing unit 91, the second processing unit 92, the calculation unit 93, and the determination unit 94. The HDD 3d stores programs for implementing the first processing unit 91, the second processing unit 92, the calculation unit 93, and the determination unit 94, respectively. These programs are represented as a first processing program, a second processing program, a calculation program, and a determination program.

An HDD storing the first processing program, an HDD storing the second processing program, an HDD storing the calculation program, and an HDD storing the determination program may be different from one another. In this case, a server that has the HDD storing the first processing program, a server that has the HDD storing the second processing program, a server that has the HDD storing a calculation program, and a server that has the HDD storing a determination program may be connected through a network (for example, the Internet). Alternatively, at least one HDD may be an external HDD connected to a USB port or the like, or a network compatible HDD (Network Attached Storage, NAS). At least two or more of these programs may be stored in the same HDD, and the remaining programs may be stored in an HDD different from this HDD (for example, the first processing program and the second processing program are stored in a first HDD, the calculation program is stored in a second HDD, and the determination program is stored in a third HDD).

These programs are represented by using the definition of elements. The first processing unit and the first processing program will be described as an example. The first processing unit performs first processing of acquiring a first image including a first region image indicating a region where a gas candidate has appeared, extracted from a predetermined region of an infrared image, on each of a plurality of infrared images captured in time series in a predetermined period to acquire a plurality of first images. The first processing program is a program that performs first processing of acquiring a first image including a first region image indicating a region where a gas candidate has appeared, extracted from a predetermined region of an infrared image, on each of a plurality of infrared images captured in time series in a predetermined period to acquire a plurality of first images.

Figure 15:
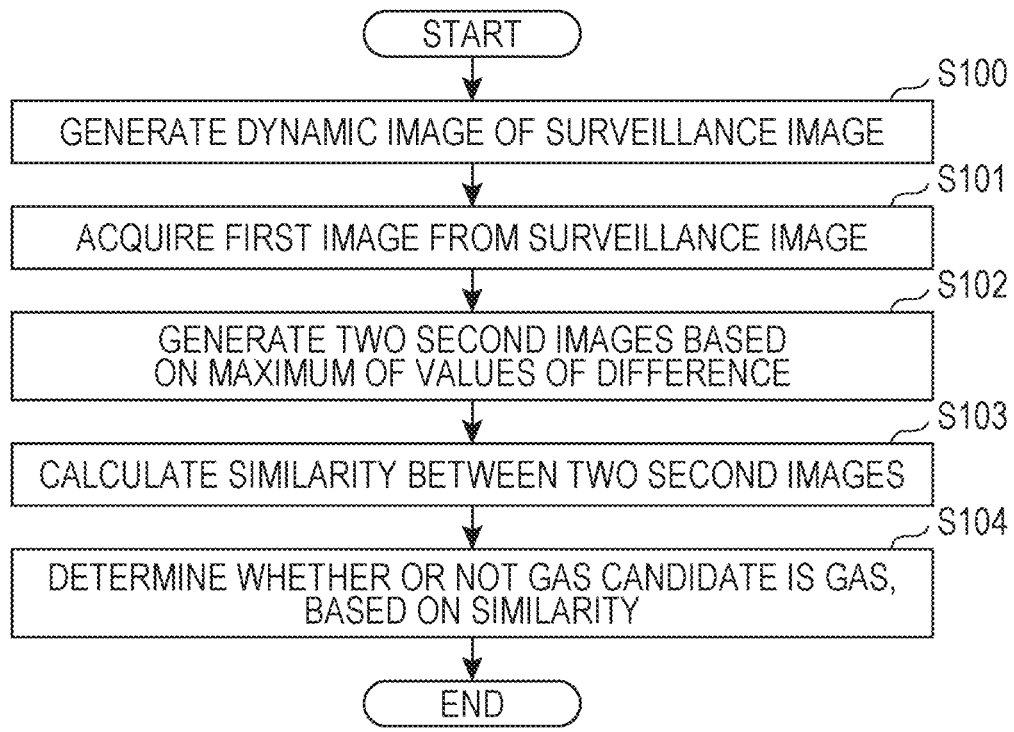
FIG. 15 is a flowchart of processing performed according to the first aspect of the embodiment.

A flowchart of these programs (the first processing program, the second processing program, the calculation program, and the determination program) executed by the CPU 3a is illustrated in FIG. 15 to be described later.

In the gas detection using an infrared image, the inventor has found that, in a case where a gas leak and background temperature change occur in parallel and background temperature change is larger than temperature change due to the leaked gas, it is not possible to display a scene of a gas leaking in an image, without considering background temperature change. This will be described in detail.

Figure 3:
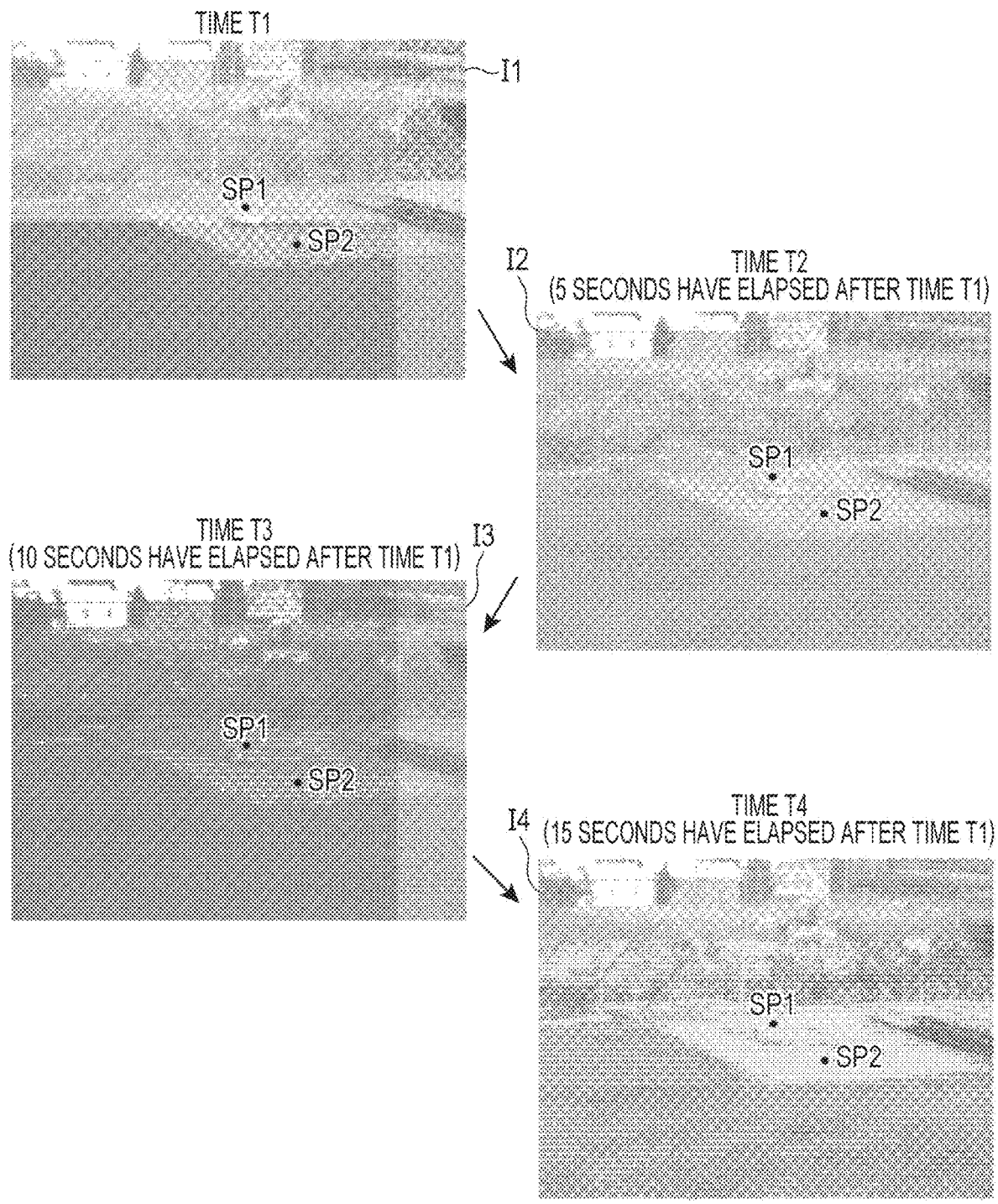
FIG. 3 is an image view illustrating, in time series, infrared images obtained by capturing images of a test site of the outdoor in a state where a gas leak and background temperature change have occurred in parallel.

FIG. 3 is an image view illustrating, in time series, infrared images obtained by capturing images of the test site of the outdoor, in a state where a gas leak and background temperature change have occurred in parallel. These are infrared images obtained by capturing a dynamic image with an infrared camera. At the test site, there is a point SP1 at which a gas may be discharged. In comparison with the point SP1, there is illustrated a point SP2 at which a gas is not discharged.

The image I1 is an infrared image of the test site captured at time T1 immediately before sunlight is blocked by a cloud. The image I2 is an infrared image of the test site captured at time T2 after 5 seconds from the time T1. Since sunlight is blocked by a cloud, the background temperature at the time T2 is lower than the background temperature at the time T1.

The image I3 is an infrared image of the test site captured at time T3 after 10 seconds from the time T1. Since a state in which sunlight is blocked by a cloud continues from the time T2 to the time T3, the background temperature at the time T3 is lower than the background temperature at the time T2.

The image I4 is an infrared image of the test site captured at time T4 after 15 seconds after the time T1. Since the state in which sunlight is blocked by a cloud continues from the time T3 to the time T4, the background temperature at the time T4 is lower than the background temperature at the time T3.

The background temperature drops by about 4° C. for 15 seconds from the time T1 to the time T4. Therefore, it can be seen that the image I4 is darker than the image I1 on the whole and background temperature is lowered.

At a time after the time T1 and before the time T2, a gas starts to be discharged at the point SP1. A temperature change due to the discharged gas is slight (about 0.5*C). Therefore, although, at the time T2, the time T3 and the time T4, a gas has been discharged at the point SP1, background temperature change is much larger than temperature change due to the discharged gas, so that it is not possible to see a scene of a gas coming out from the point SP1, even when looking at the image I2, the image I3, and the image I4.

Figure 4A:
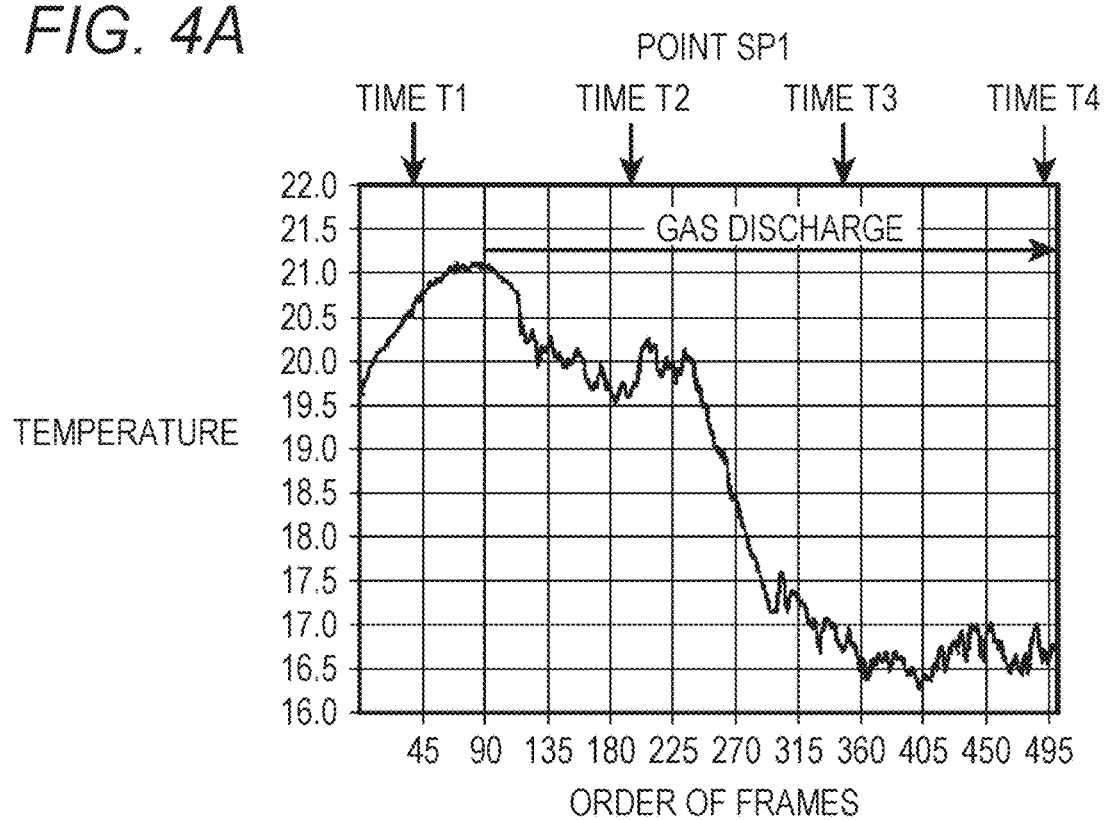
FIG. 4A is a graph illustrating temperature change of a point SP1 at the test site.
Figure 4B:
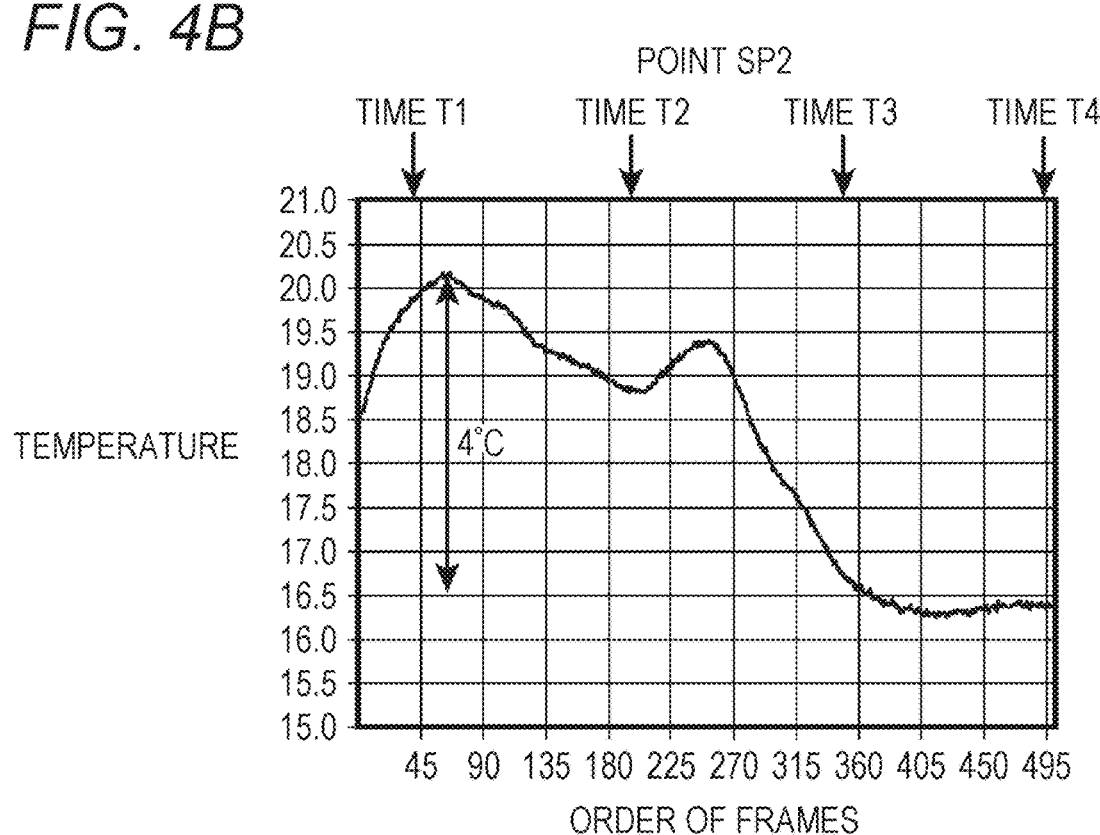
FIG. 4B is a graph illustrating temperature change of a point SP2 at the test site.

FIG. 4A is a graph illustrating the temperature change of the point SP1 at the test site, and FIG. 4B is a graph illustrating the temperature change of the point SP2 at the test site. Vertical axes of these graphs indicate temperature. Horizontal axes of these graphs indicate an order of frames. For example, 45 means a 45-th frame. A frame rate is 30 fps. Thus, a time period from the first frame to the 450-th frame is 15 seconds.

The graph illustrating the temperature change of the point SP1 and the graph illustrating the temperature change of the point SP2 are different. Since no gas is discharged at the point SP2, the temperature change of the point SP2 indicates background temperature change. On the contrary, since a gas is discharged at the point SP1, the gas is in the air at the point SP1. Therefore, the temperature change of the point SP1 indicates temperature change obtained by adding background temperature change and temperature change due to the leaked gas.

From the graph illustrated in FIG. 4A, it can be seen that a gas has been discharged at the point SP1 (that is, it can be seen that a gas leak has occurred at the point SP1). However, as described above, it can not be seen, from the image I2, the image I3 and the image I4 illustrated in FIG. 3, that the gas has been discharged at the point SP1 (that is, it can not be seen that a gas leak has occurred at the point SP1).

In this way, in a case where background temperature change is much larger than temperature change due to the discharged gas (leaked gas), it is not possible to see a scene of a gas coming out from the point SP1, even when looking at the image I2, the image I3 and the image I4 illustrated in FIG. 3.

This reason is that, in addition to frequency component data indicating temperature change due to the leaked gas, low frequency component data D2 indicating background temperature change, which has frequency lower than that of this frequency component data, is included in the dynamic image data MD (FIG. 1A). Due to an image indicated by low frequency component data D2 (a change of light or dark of the background), an image indicated by frequency component data is invisible. With reference to FIGS. 4A and 4B, fine changes included in the graph illustrating the temperature change of point SP1 correspond to frequency component data. The graph illustrating the temperature change of the point SP2 corresponds to low frequency component data D2.

In this regard, the image processing unit 9 (FIG. 1A) generates, from the dynamic image data MD, a plurality of time series pixel data D1 (that is, a plurality of time series pixel data D1 configuring the dynamic image data MD) having different pixel positions, and performs processing of removing low frequency component data D2 from each of the plurality of time series pixel data D1. With reference to FIG. 2, a plurality of time series pixel data having different pixel positions means time series pixel data D1 of the first pixel, time series pixel data D1 of the second pixel, and, . . . , time series pixel data D1 of the (M−1)-th pixel and time series pixel data D1 of the M-th pixel.

Frequency component data indicating a high frequency noise, which has higher frequency than that of frequency component data indicating temperature change due to the leaked gas, is set as high frequency component data D3. In addition to the processing of removing low frequency component data D2, the image processing unit 9 performs processing of removing high frequency component data D3 from each of the plurality of time series pixel data D1 configuring the dynamic image data MD.

In this way, the image processing unit 9 performs processing of removing low frequency component data D2 and high frequency component data D3 in units of time series pixel data D1, instead of performing processing of removing low frequency component data D2 and high frequency component data D3 in units of a frame.

The gas detection-use image processing device 3 generates a surveillance image by using an infrared image. In a case where a gas leak has occurred, the surveillance image includes an image illustrating a region where a gas has appeared due to the gas leak. The gas detection-use image processing device 3 detects a gas leak based on the surveillance image. There are various methods of generating the surveillance image. Herein, an example of a method of generating the surveillance image will be described. The surveillance image is generated by using infrared images of the surveillance object and the background. FIG. 5 is a flowchart for describing the surveillance image generation process.

With reference to FIGS. 1A, 2 and 5, the image processing unit 9 generates an M number of time series pixel data D1 from the dynamic image data MD (step S1).

The image processing unit 9 sets, as low frequency component data D2, data extracted from the time series pixel data D1 by calculating a simple moving average with respect to time series pixel data D1, in units of a first predetermined number of frames less than a K number of frames, and extracts an M number of low frequency component data D2 respectively corresponding to the M number of time series pixel data D1 (step S2).

The first predetermined number of frames is, for example, 21 frames. The details of frames are as follows: a target frame, 10 consecutive frames before the target frame, and 10 consecutive frames after the target frame. The first predetermined number may be any number as long as low frequency component data D2 is extracted from the time series pixel data D1, and may be more than 21 or less than 21, without being limited to 21.

The image processing unit 9 sets, as high frequency component data D3, data extracted from time series pixel data D1 by calculating a simple moving average with respect to time series pixel data D1, in units of a third predetermined number (for example, 3) of frames less than the first predetermined number (for example, 21) of frames, and extracts an M number of high frequency component data D3 respectively corresponding to the M number of time series pixel data D1 (step S3).

Figure 6:
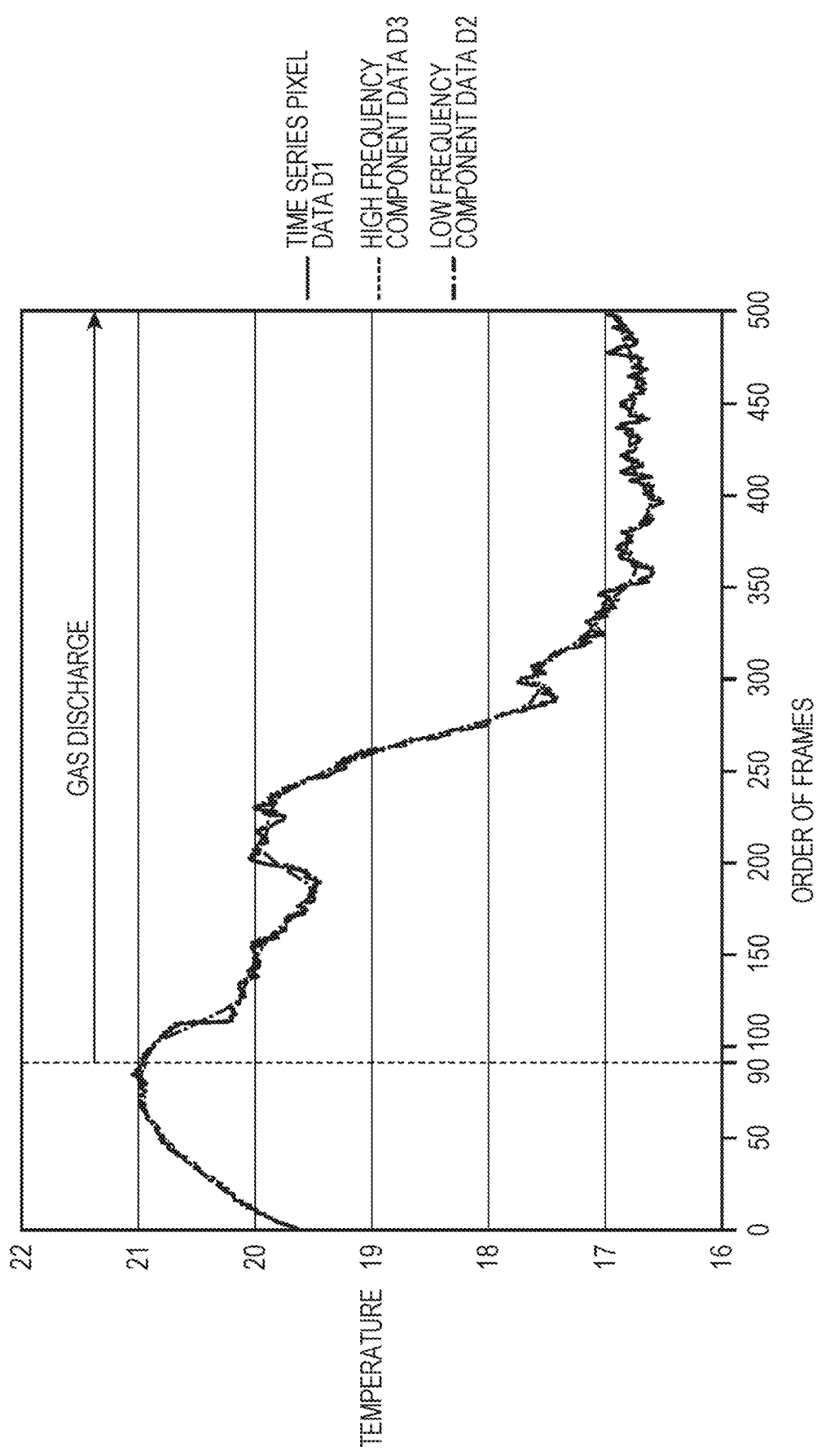
FIG. 6 is a graph illustrating time series pixel data D1 of a pixel corresponding to a point SP1 (FIG. 3), low frequency component data D2 extracted from the time series pixel data D1, and high frequency component data D3 extracted from the time series pixel data D1.

FIG. 6 is a graph illustrating time series pixel data D1 of the pixel corresponding to the point SP1 (FIG. 4A), low frequency component data D2 extracted from the time series pixel data D1, and high frequency component data D3 extracted from the time series pixel data D1. The vertical and horizontal axes of the graph are the same as the vertical and horizontal axes of the graph in FIG. 4A. The temperature indicated by the time series pixel data D1 changes relatively rapidly (a period of change is relatively short), and the temperature indicated by low frequency component data D2 changes relatively slowly (a period of change is relatively long). The high frequency component data D3 looks substantially overlapped with the time series pixel data D1.

The third predetermined number of frames is, for example, 3 frames. The details of frames are as follows: a target frame, one frame immediately before the target frame, and one frame immediately after the target frame. The third predetermined number may be any number as long as a third frequency component is extracted from time series pixel data, and may be more than 3, without being limited to 3.

With reference to FIGS. 1A, 2 and 5, the image processing unit 9 sets, as difference data D4, data obtained by calculating a difference between time series pixel data D1 and low frequency component data D2 extracted from the time series pixel data D1, and calculates an M number of difference data D4 respectively corresponding to the M number of time series pixel data D1 (step S4).

The image processing unit 9 sets, as difference data D5, data obtained by calculating a difference between time series pixel data D1 and high frequency component data D3 extracted from the time series pixel data D1, and calculates an M number of difference data D5 respectively corresponding to the M number of time series pixel data D1 (step S5).

Figure 7A:
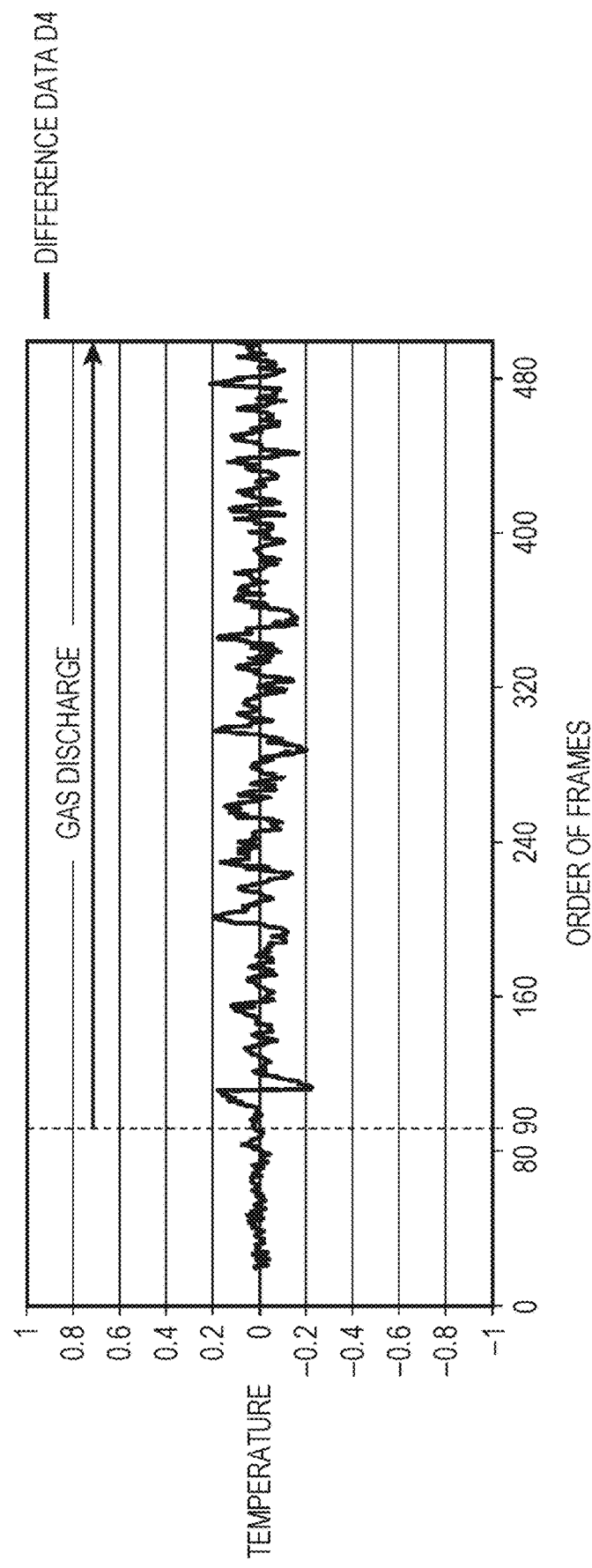
FIG. 7A is a graph illustrating difference data D4.
Figure 7B:
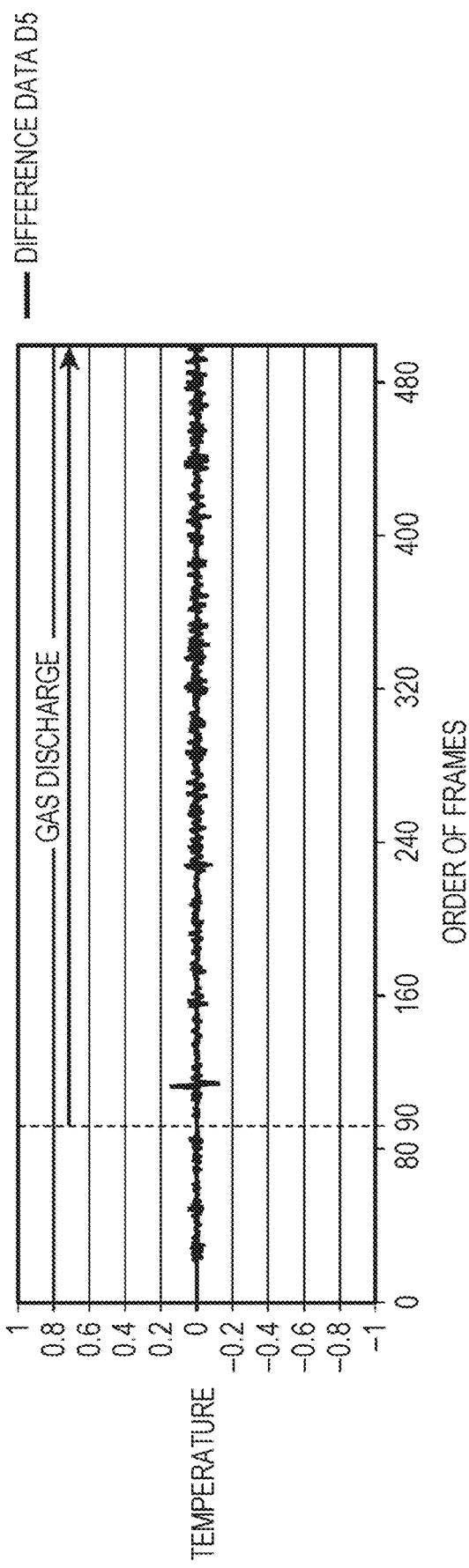
FIG. 7B is a graph illustrating difference data D5.

FIG. 7A is a graph illustrating difference data D4, and FIG. 7B is a graph illustrating difference data D5. The vertical and horizontal axes of these graphs are the same as the vertical and horizontal axes of the graph in FIG. 4A. The difference data D4 is data obtained by calculating a difference between the time series pixel data D1 and low frequency component data D2 illustrated in FIG. 6. Before discharge of a gas is started at the point SP1 illustrated in FIG. 4A (frames up to about the 90-th frame), the repetition of a fine amplitude indicated by difference data D4 mainly indicates a sensor noise of the two-dimensional image sensor 6. After discharge of a gas is started at the point SP1 (the 90-th and subsequent frames), variations in the amplitude and waveform of difference data D4 are large.

The difference data D5 is data obtained by calculating a difference between the time series pixel data D1 and high frequency component data D3 illustrated in FIG. 6.

The difference data D4 includes frequency component data indicating temperature change due to the leaked gas and high frequency component data D3 (data indicating a high frequency noise). The difference data D5 does not include frequency component data indicating temperature change due to the leaked gas, but includes high frequency component data D3.

Since difference data D4 includes frequency component data indicating temperature change due to the leaked gas, variations in the amplitude and waveform of difference data D4 are large, after the discharge of a gas is started at the point SP1 (the 90-th and subsequent frames). On the contrary, since difference data D5 does not include frequency component data indicating temperature change due to the leaked gas, variations in the amplitude and waveform of difference data D5 are not large. The difference data D5 indicates the repetition of fine amplitudes. This indicates a high frequency noise.

Although difference data D4 and difference data D5 are correlated, difference data D4 and difference data D5 are not completely correlated. That is, there is a case where, in a certain frame, a value of difference data D4 may be positive and a value of difference data D5 may be negative, or vice versa. Therefore, even though a difference between difference data D4 and difference data D5 is calculated, it is not possible to remove high frequency component data D3. In order to remove high frequency component data D3, it is necessary to convert difference data D4 and difference data D5 into values such as absolute values between which a subtraction is performable.

In this regard, the image processing unit 9 sets, as standard deviation data D6, data obtained by calculating a moving standard deviation with respect to difference data D4, in units of a second predetermined number of frames less than the K number of frames, and calculates an M number of standard deviation data D6 respectively corresponding to the M number of time series pixel data D1 (step S6). Incidentally, instead of the moving standard deviation, a moving variance may be calculated.

Also, the image processing unit 9 sets, as standard deviation data D7, data obtained by calculating a moving standard deviation with respect to difference data D5, in units of a fourth predetermined number (for example, 21) of frames less than the K number of frames, and calculates an M number of standard deviation data D7 respectively corresponding to the M number of time series pixel data D1 (step S7). Instead of the moving standard deviation, the moving variance may be used.

Figure 8:
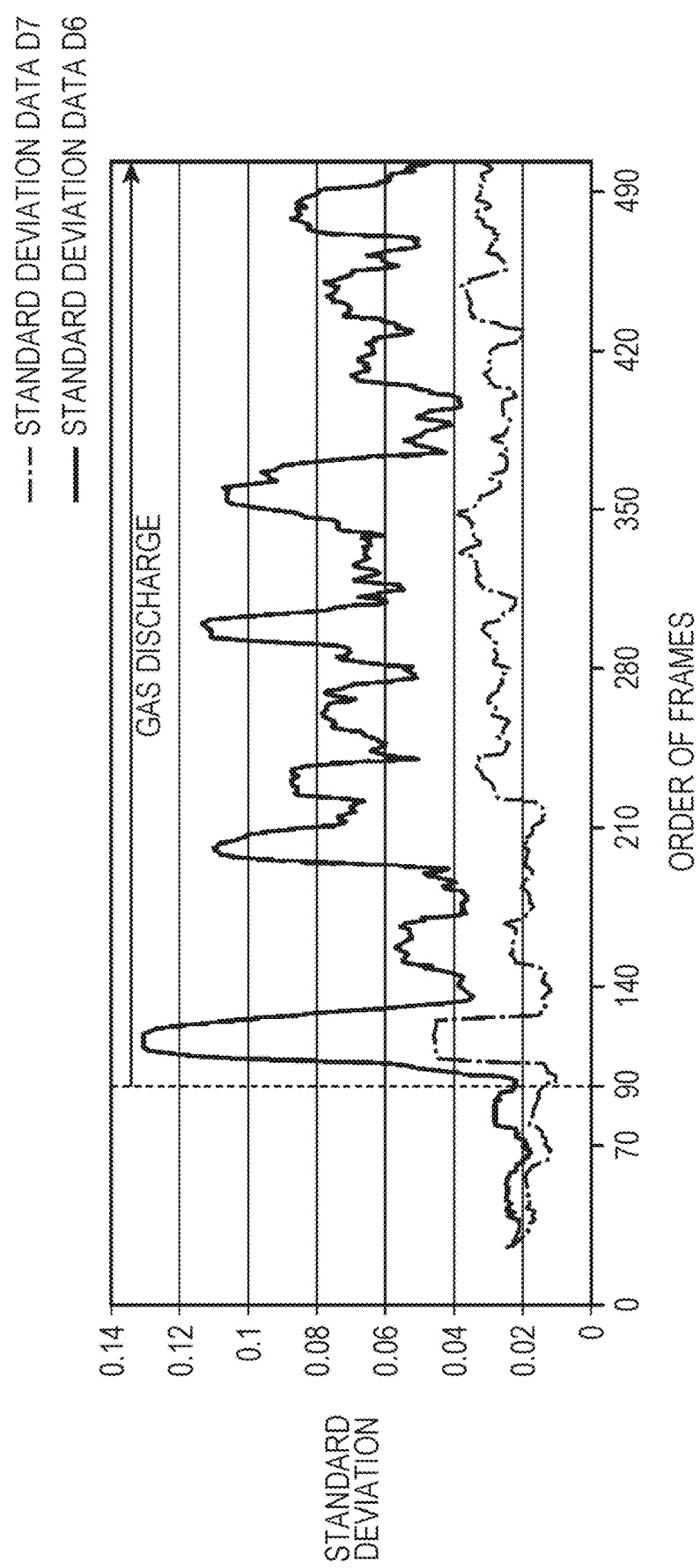
FIG. 8 is a graph illustrating standard deviation data D6 and standard deviation data D7.

FIG. 8 is a graph illustrating standard deviation data D6 and standard deviation data D7. The horizontal axis of the graph is the same as the horizontal axis of the graph in FIG. 4A. The vertical axis of the graph indicates standard deviation. The standard deviation data D6 is data indicating the moving standard deviation of difference data D4 illustrated in FIG. 7A. The standard deviation data D7 is data indicating the moving standard deviation of difference data D5 illustrated in FIG. 7B. Although the number of frames used for calculating the moving standard deviation is 21 for both of standard deviation data D6 and standard deviation data D7, the number of frames may be any number as long as a statistically significant standard deviation is obtained, without being limited to 21.

Since standard deviation data D6 and standard deviation data D7 are standard deviations, standard deviation data D6 and standard deviation data D7 do not include negative values. Therefore, it is possible to regard standard deviation data D6 and standard deviation data D7 as data converted such that a subtraction between difference data D4 and difference data D5 is performable.

The image processing unit 9 sets, as difference data D8, data obtained by calculating a difference between standard deviation data D6 and standard deviation data D7 obtained from the same time series pixel data D1, and calculates an M number of difference data D8 respectively corresponding to the M number of time series pixel data D1 (step S8).

Figure 9:
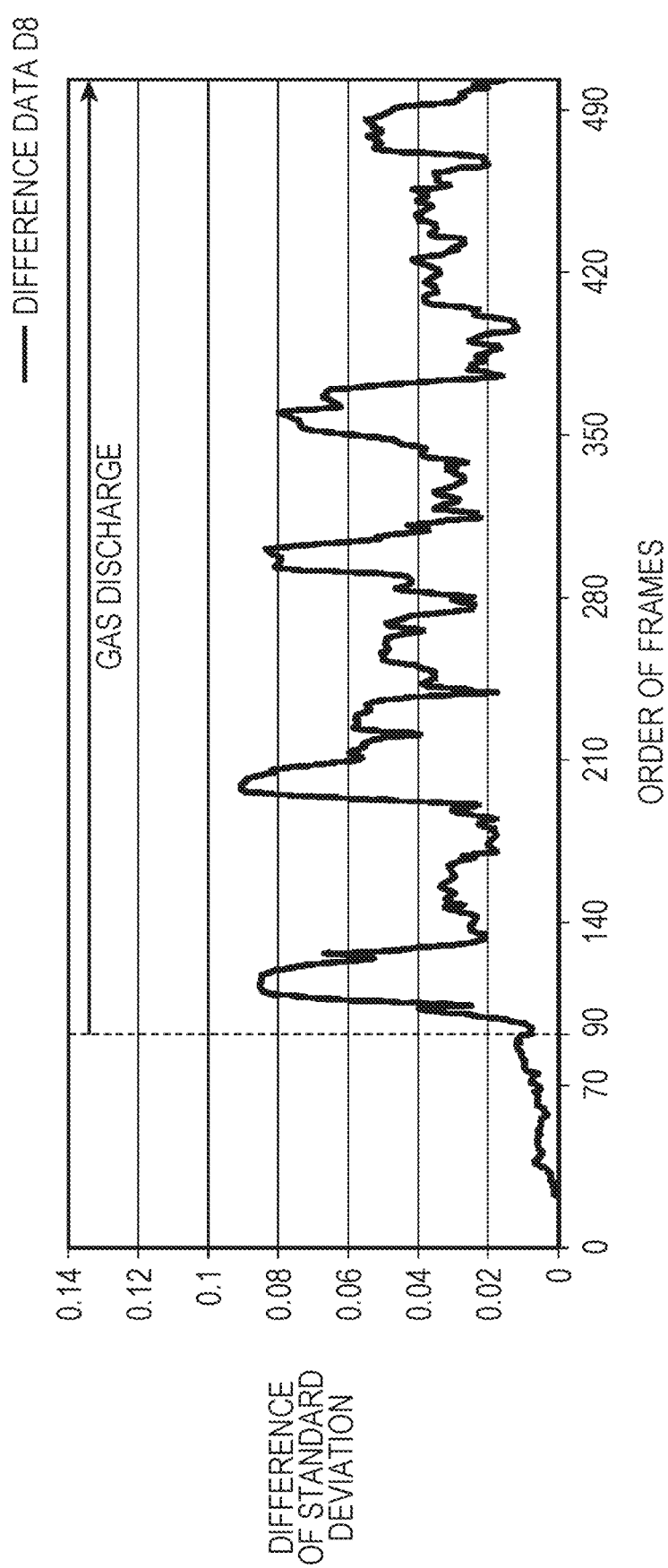
FIG. 9 is a graph illustrating difference data D8.

FIG. 9 is a graph illustrating difference data D5. The horizontal axis of the graph is the same as the horizontal axis of the graph in FIG. 4A. The vertical axis of the graph is difference of standard deviation. The difference data D8 is data indicating a difference between standard deviation data D6 and standard deviation data D7 illustrated in FIG. 8. The difference data D8 is data on which the processing of removing low frequency component data D2 and high frequency component data D3 is performed.

The image processing unit 9 generates a surveillance image (step S9). That is, the image processing unit 9 generates a dynamic image configured with the M number of difference data D8 obtained in step S8. Each frame configuring this dynamic image is a surveillance image. The surveillance image is an image in which difference of standard deviation is visualized. The image processing unit 9 outputs the dynamic image obtained in step S9 to the display control unit 10. The display control unit 10 causes the display unit 11 to display this dynamic image. As surveillance images included in this dynamic image, for example, there are the image I12 illustrated in FIG. 10 and the image I15 illustrated in FIG. 11.

Figure 10:
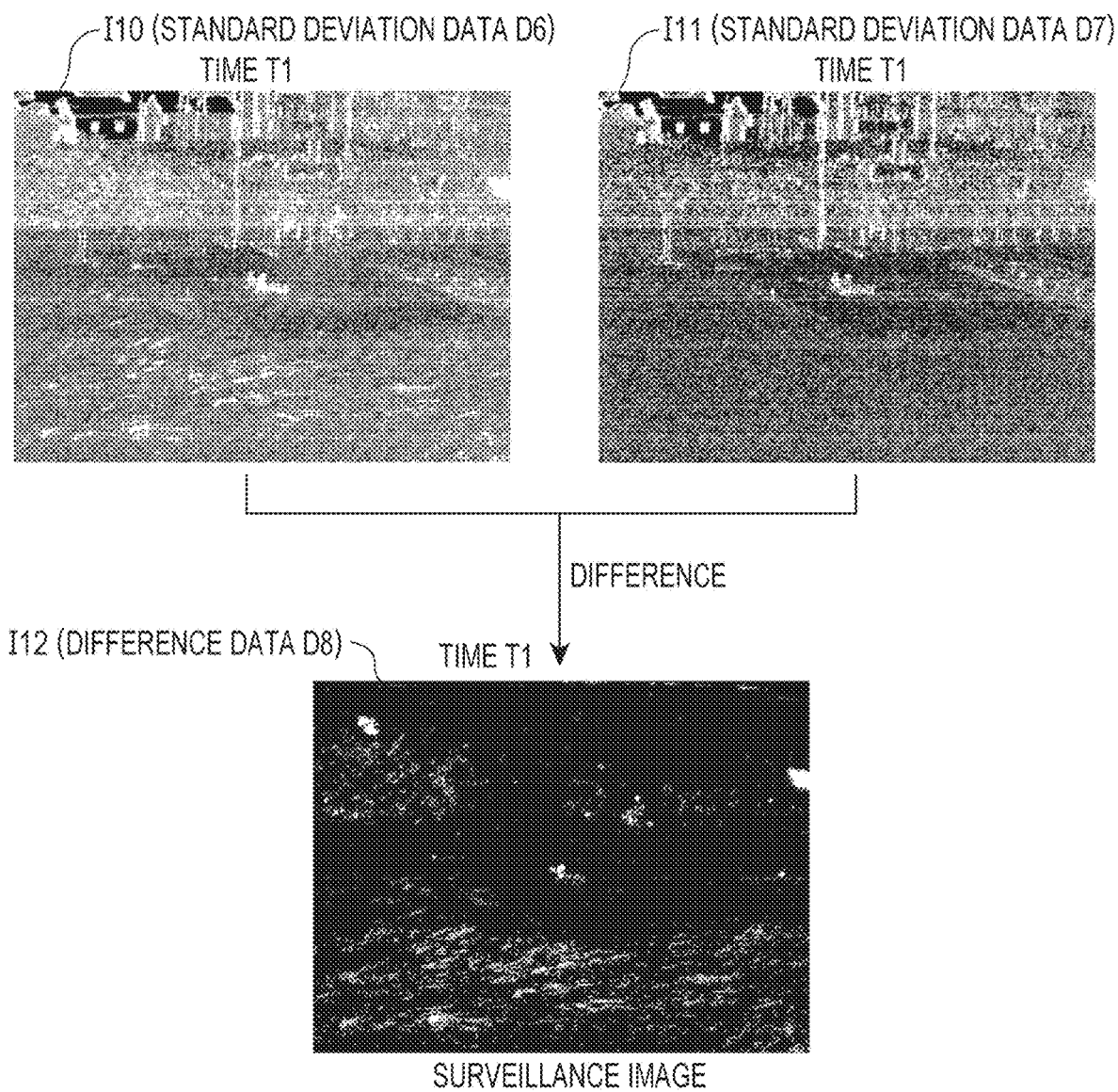
FIG. 10 is an image view illustrating an image I10, an image I11, and an image I12 generated based on a frame at time T1.

FIG. 10 is an image view illustrating an image I10, an image I11 and an image I12 generated based on a frame at time T1. The image I110 is an image of a frame at time T1 in a dynamic image indicated by the M number of standard deviation data D6 obtained in step S6 of FIG. 5. The image I11 is an image of a frame at time T1 in a dynamic image indicated by the M number of standard deviation data D7 obtained in step S7 of FIG. 5. A difference between the image I10 and the image I11 is an image I12 (surveillance image).

Figure 11:
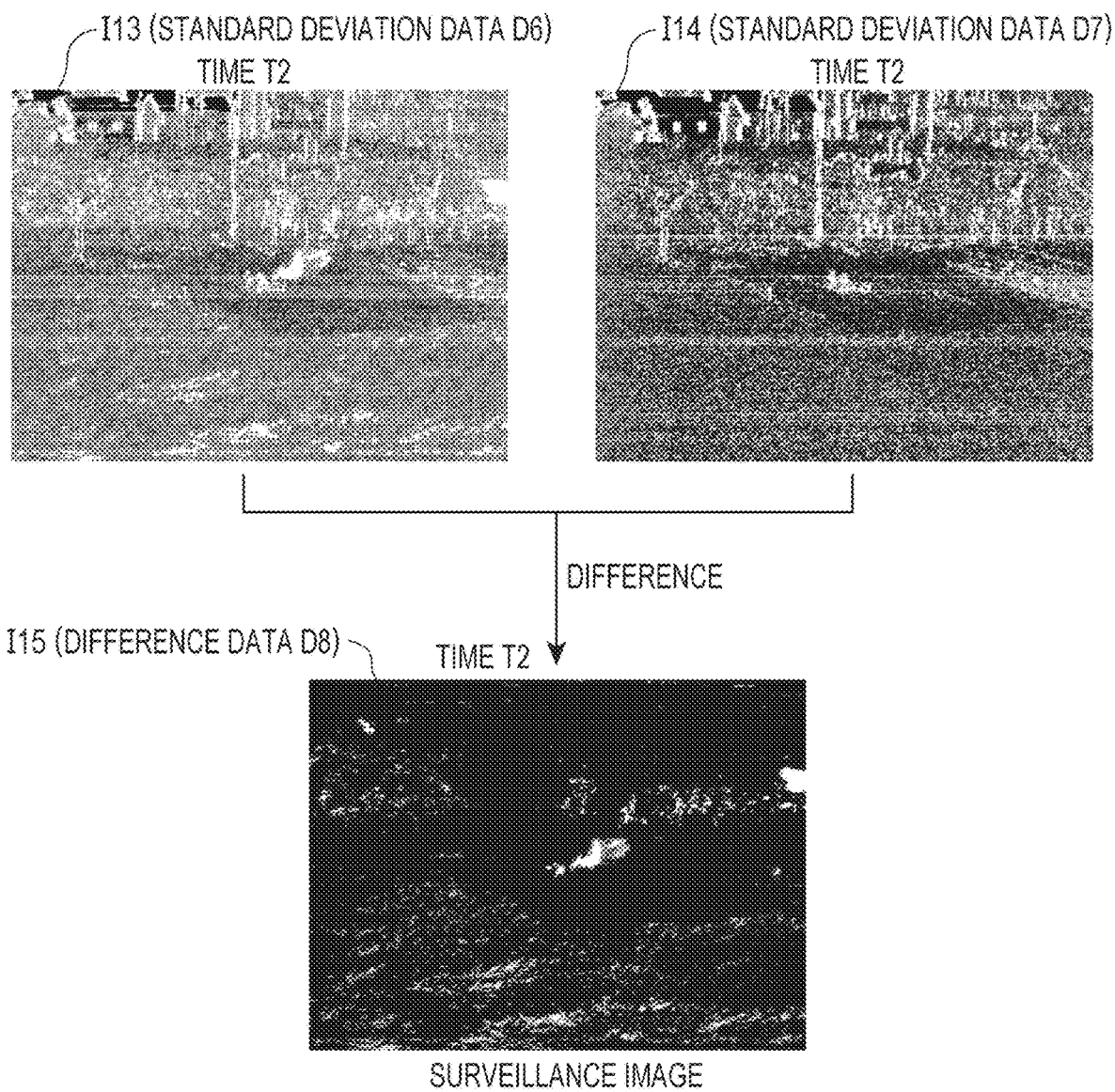
FIG. 11 is an image view illustrating an image I13, an image I14, and an image I15 generated based on a frame at time T2.

FIG. 11 is an image view illustrating an image I13, an image I14 and an image I15 generated based on a frame at time T2. The image I13 is an image of a frame at time T2 in a dynamic image indicated by the M number of standard deviation data D6 obtained in step S6. The image I14 is an image of a frame at time T2 in a dynamic image indicated by the M number of standard deviation data D7 obtained in step S7. A difference between the image I13 and the image I14 is an image I15 (surveillance image). All of the images I10 to I15 illustrated in FIGS. 10 and 11 are images in which standard deviation is set to 5000 times.

Since the image I12 illustrated in FIG. 10 is an image captured before a gas is discharged from the point SP1 illustrated in FIG. 4A, the image I12 does not illustrate a scene of a gas coming out from the point SP1. On the contrary, since the image I15 illustrated in FIG. 11 is an image captured at a time when a gas is discharged from the point SP1, the image I15 illustrates a scene of a gas coming out from the point SP1.

As described above, according to the embodiment, the image processing unit 9 (FIG. 1A) performs processing of removing low frequency component data D2 included in dynamic image data MD of these infrared images to generate dynamic image data, and the display control unit 10 causes the display unit 11 to display the dynamic image (dynamic image of surveillance images) indicated by this dynamic image data. Therefore, according to the embodiment, even though a gas leak and background temperature change occur in parallel and background temperature change is larger than temperature change due to the leaked gas, it is possible to display a scene of a gas leaking in a dynamic image of the surveillance image.

Since the sensor noise decreases as the temperature increases, it varies depending on the temperature. In the two-dimensional image sensor 6 (FIG. 1A), a noise corresponding to the temperature sensed by a pixel is generated in each pixel. That is, noises of all pixels are not the same. According to the embodiment, since a high frequency noise is removable from the dynamic image, it is possible to display even a slight gas leak on the display unit 11.

Figure 12:
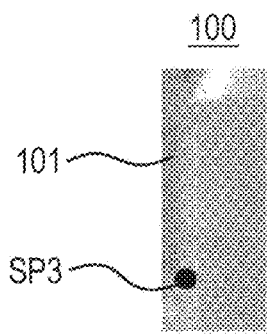
FIG. 12 is an image view illustrating an image cut out from an infrared image.

The false detection of a gas caused by steam will be described. FIG. 12 is an image view illustrating an image 100 cut out from an infrared image. The image 100 includes a tower image 101. The heat from the heat source is reflected on a surface (reflective surface) of a tower. The surface of the tower has a curved surface. Steam exists in the middle of the area from the heat source to the tower. No gas has appeared in the vicinity of the tower and no gas exists at one point SP3 on the surface of the tower. The point SP3 corresponds to one pixel of the image 100.

Figure 13:
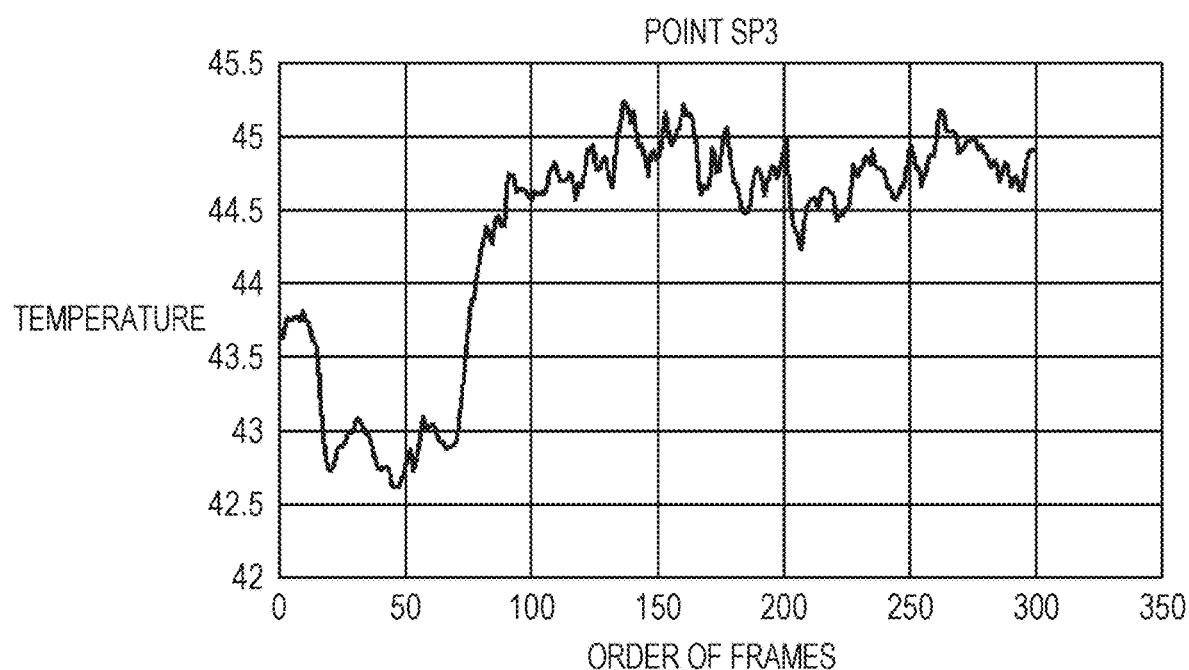
FIG. 13 is a graph illustrating temperature change of a point SP3.

FIG. 13 is a graph illustrating the temperature change of the point SP3. The horizontal and vertical axes of the graph are the same as the horizontal and vertical axes of the graph in FIG. 4A. Since the frame rate is 30 fps, a graph of temperature change for 10 seconds is illustrated. With reference to FIGS. 4A and 13, temperature change at point SP3 and temperature change at point SP1 where a gas leaks are common in that temperature changes finely.

Figure 14:
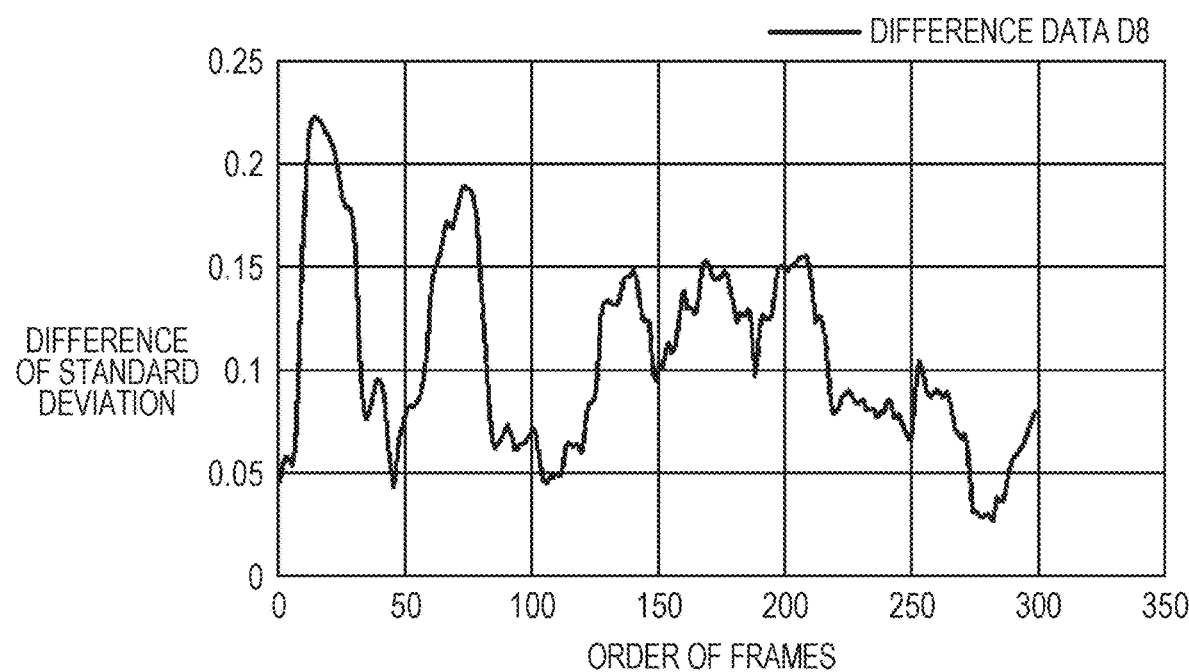
FIG. 14 is a graph illustrating difference data D8 generated based on time series pixel data D1 illustrating temperature change at the point SP3.

FIG. 14 is a graph illustrating difference data D8 generated based on time series pixel data D1 indicating temperature change of point SP3. The horizontal axis of the graph is the same as the horizontal axis of the graph in FIG. 4A. The vertical axis of the graph indicates difference of standard deviation. The difference data D8 is generated by performing processing of steps S2 to S8 illustrated in FIG. 5 on the time series pixel data D1 indicating the temperature change of the point SP3.

With reference to FIG. 9, the difference data D8 in a period during which a gas comes out is larger than difference data D8 in a period during which no gas comes out. The difference data D8 illustrated in FIG. 14 is as large as difference data D8 in a period during which a gas comes out. Therefore, in a case where difference data D8 illustrated in FIG. 14 is obtained, there is a possibility that the gas detection-use image processing device 3 performs false detection as a gas.

Although the case where steam exists in the middle of the area from the heat source to the reflective surface has been described as an example, the same applies to a case where steam exists in the middle of the area from the light source to the reflective surface. Also, even though where no steam exists, the same applies to a case where the heat source and the light source fluctuate. In the embodiment, it is possible to distinguish between such a case and the case where a gas has appeared. There are provided first to third aspects according to the embodiment. The first aspect will be described. FIG. 15 is a flowchart of processing performed according to the first aspect of the embodiment.

With reference to FIGS. 1A and 15, the first processing unit 91 generates a dynamic image of a surveillance image based on dynamic image data MD (step S100). In detail, it is described that the first processing unit 91 performs the processing of steps S1 to S9 illustrated in FIG. 5, on the dynamic image data MD. In this way, each frame configuring the dynamic image changes from an infrared image to a surveillance image, and the dynamic image of the surveillance image is generated. The surveillance image is, for example, the image I12 illustrated in FIG. 10, or the image I15 illustrated in FIG. 11. In a case where a gas candidate has appeared, a first region image illustrating a region where the gas candidate has appeared is included in the surveillance image. An image (hereinafter, referred to as a gas region image) illustrating a region where a gas has appeared may be the first region image, and an image (hereinafter, referred to as a non-gas region image) generated due to the above case may be the first region image. The image I15 is an image after two seconds from the start of a gas discharge. A white region located in the vicinity of the center of the image I15 is the first region image. Herein, the first region image is the gas region image.

In the embodiment, the first region image is obtained through the processing of steps S1 to S9, but the first region image may be obtained using a known technique (for example, image processing disclosed in Patent Literature 1) of obtaining a gas region image through image processing on an infrared image.

As described above, the processing of step S100 is processing of extracting the first region image from the infrared image. The infrared image subjected to the processing of extracting the first region image is a surveillance image.

It is considered that each frame (each surveillance image) configuring a dynamic image generated in step S100 includes the first region image. The first processing unit 91 sets a predetermined region including the first region image in each surveillance image to acquire the predetermined region as a first image (step S101). That is, the first processing unit 91 sets a predetermined region including the first region image in each infrared image subjected to the processing of extracting the first region image to acquire the predetermined region as the first image.

Figure 16:
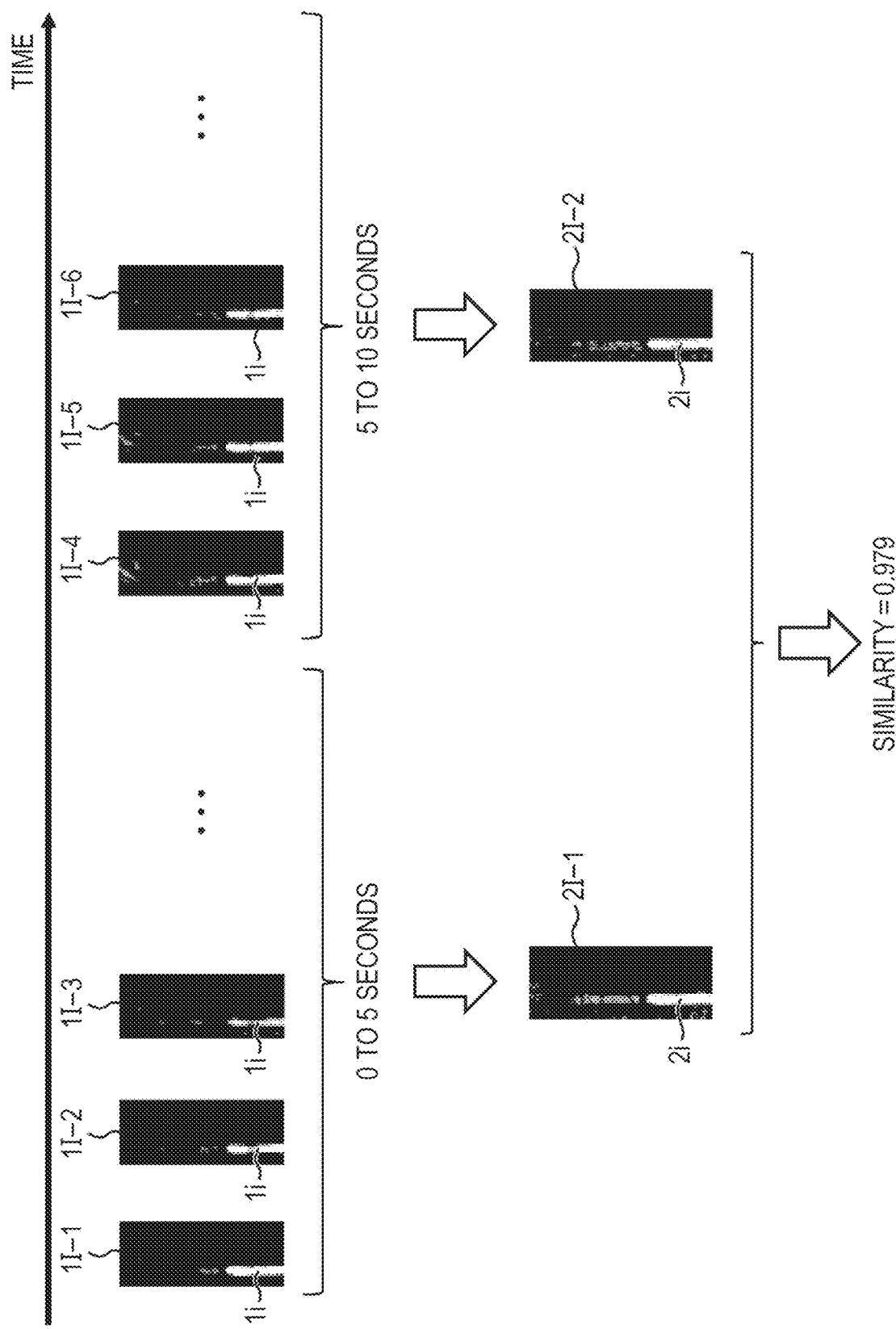
FIG. 16 is an explanatory view for describing a first image 1I and a second image 2I generated according to a first aspect of the embodiment, in a case where steam exists in the middle of an area from the heat source to the reflective surface.

FIG. 16 is an explanatory view for describing a first image 1I and a second image 2I generated according to the first aspect of the embodiment, in a case where steam exists in the middle of the area from the heat source to the reflective surface. FIG. 16 illustrates the first image 1I cut out from the surveillance image. The first processing unit 91 may automatically cut out the first image 1I from the surveillance image. Alternatively, a user may actually operate the gas detection system 1 to confirm a region where reflection erroneously recognized as a gas occurs and manually cut out the region. In the latter case, the user decides a size of the first image 1I such that the first image 1I includes a first region image 1i. The decided size is stored in advance in the first processing unit 91. In the former case, for example, after performing binarization of surveillance images illustrated in FIGS. 10 and 11 (that is, for example, after performing binarization of difference data D8 illustrated in FIG. 9 and difference data D8 illustrated in FIG. 14 with a predetermined threshold value (for example, 0.02)), the first processing unit 91 performs labeling processing, and automatically performs cutting out.

The dynamic image generated in step S100 is, for example, a dynamic image for 10 seconds. Each first image 1I illustrated in FIG. 16 is a first image 1I set in each frame (each surveillance image) configuring the dynamic image. For example, the first image 1I-1 is a first image 1I set in a first surveillance image, a first image 1I-2 is a first image 1I set in a second surveillance image, a first image 1I-3 is a first image 1I set in a third surveillance image, a first image 1I-4 is a first image 1I set in an N-th surveillance image, a first image 1I-5 is a first image 1I set in an (N+1)-th surveillance image, and a first image 1I-6 is a first image 1I set in an (N+2)-th surveillance image.

The first image 1I is a part of the surveillance image and has a rectangular shape. The shape of the first image 1I is not limited to the rectangular shape. A value of each pixel configuring the first image 1I is difference of standard deviation. In the first image 1I, an image configured with pixels other than black pixels is the first region image 1i. The first region image 1i does not always have the same shape, but changes with the elapse of time. This is because steam exists in the middle of the area from the heat source to the reflective surface.

As described above, the first processing unit 91 performs first processing on a plurality of infrared images captured in time series in each of two predetermined periods (0 to 5 seconds, and 5 to 10 seconds) (step S100 and step S101). The first processing is processing of acquiring the first image 1I including the first region image 1i extracted from a predetermined region of an infrared image. The first processing unit 91 performs first processing on each of a plurality of infrared images captured in time series in a predetermined period (0 to 5 seconds) to acquire a plurality of first images 1I (the first image 1I-1, the first image 1I-2, the first image 1I-3, and, . . . ), and performs first processing on each of a plurality of infrared images captured in time series in a predetermined period (5 to 10 seconds) to acquire a plurality of first images 1I (the first image 1I-4, the first image 1I-5, the first image 1I-6, and, . . . ).

According to the first aspect of the embodiment, the first processing unit 91 performs processing of extracting the first region image 1i from each infrared image (step S100), and sets a predetermined region including the first region image 1i in each infrared image subjected to this processing to acquire the predetermined region as the first image 1I (step S101). However, as a modification, the user may set the predetermined region in the infrared image in advance. The modification is applied when a position where a gas is highly likely to appear is known in advance. In detail, it is described that, with reference to FIG. 1A, the input unit 12 functions as a first input unit. The display control unit 10 causes the display unit 11 to display a dynamic image (a dynamic image of infrared images) indicated by the dynamic image data MD. The user operates the input unit 12 to set a predetermined region in the infrared image displayed on the display unit 11.

When the input unit 12 is operated to set a predetermined region in the infrared image, the first processing unit 91 performs processing of extracting the first region image 1i on a predetermined region, instead of performing processing of extracting the first region image 1i on the entire infrared image. The first processing unit 91 acquires the predetermined region subjected to this processing as the first image 1I.

According to the modification, since the processing of extracting the first region image 1i is not performed on the entire infrared image, but the processing of extracting the first region image 1i is performed on a predetermined region set in the infrared image, it is possible to reduce an amount of image processing. The modification is also applicable to the second and third aspects of the embodiment to be described later.

It returns to the description of the first aspect of the embodiment. The second processing unit 92 generates two second images 2I-1 and 2I-2 (step S102). For example, the second processing unit 92 generates a second image 2I-1, by using a plurality of first images 1I (the first image 1I-1, the first image 1I-2, the first image 1I-3, and, . . . ) acquired from each frame (each surveillance image) configuring a dynamic image for 0 to 5 seconds (a predetermined period). In detail, it is described that the second processing unit 92 decides a maximum value of values (herein, difference of the standard deviation) indicated by the pixels among pixels located in the same order in the plurality of first images 1I. The second processing unit 92 sets this maximum value as a value of the pixel located in the above order of the second image 2I-1. Specifically, it is described that the second processing unit 92 decides a maximum value of values indicated by these first pixels in the plurality of first images 1I, and sets this value as a value of the first pixel of the second image 2I-1.

The second processing unit 92 decides a maximum value of values indicated by the second pixels in the plurality of first images 1I, and sets this value as the value of the second pixel of the second image 2I-1. The second processing unit 92 performs the same processing on the third and subsequent pixels.

In this manner, once values of pixels configuring the second image 2I-1 are determined, it has been seen that an image included in the second image 2I-1 becomes an image (a second region image 2*i*) indicating a region where a gas candidate has appeared in at least a part of a predetermined period. This is also applicable to a second image 2I-2 to a second image 2I-6 to be described later. According to the first aspect of the embodiment, the second image 2I is generated by using a maximum value of pixels located in the same order. The method of generating the second image 2I is not limited to this method, but the second image 2I is generated by another method according to the second aspect of the embodiment to be described later.

For example, the second processing unit 92 generates the second image 2I-2, by using a plurality of first images 1I (the first image 1I-4, the first image 1I-5, the first image 1I-6, and, . . . ) acquired from each frame (each surveillance image) configuring a dynamic image for 5 to 10 seconds (a predetermined period). Since the method of generating the second image 2I-2 is the same as the method of generating the second image 2I-1, the description thereof will not be repeated.

As described above, the second processing unit 92 performs the second processing on a plurality of first images 1I generated corresponding to each of two predetermined periods (0 to 5 seconds, and 5 to 10 seconds) to generate two second images 2I-1 and 2I-2. The second processing is processing of generating a second image 2I including a second region image 2*i* indicating a region where a gas candidate has appeared in at least a part of a predetermined period, by using the plurality of first images 1I.

The calculation unit 93 calculates the similarity between the second image 2I-1 and the second image 2I-2 by using Equation 1 (step S103). Equation 1 indicates Normalized Cross Correlation (NCC).

[Equation 1]

$$\text{Similarity} = \frac{\sum_{j=0}^{N-1}\sum_{i=0}^{M-1} I(i,j)T(i,j)}{\sqrt{\sum_{j=0}^{N-1}\sum_{i=0}^{M-1} I(i,j) \times \sum_{j=0}^{N-1}\sum_{i=0}^{M-1} T(i,j)^2}} \quad \text{(Equation 1)}$$

I(i, j) indicates coordinates on the second image 2I-1. T(i, j) indicates coordinates on the second image 2I-2. The i indicates a coordinate value in an x-direction. j indicates a coordinate value in a y-direction. M indicates the number of pixels in the x-direction of the second image 2I. N indicates the number of pixels in the y-direction of the second image 2I.

The normalized cross correlation is a value in the range of −1 to +1. In a case where no correlation exists between the second image 2I-1 and the second image 2I-2, the normalized cross correlation is zero. The normalized cross correlation approaches +1 as positive correlation between the second image 2I-1 and the second image 2I-2 becomes stronger. The normalized cross correlation approaches −1 as negative correlation between the second image 2I-1 and the second image 2I-2 becomes stronger. The similarity between the second image 2I-1 and the second image 2I-2 increases as the normalized cross correlation approaches +1. The similarity between the second image 2I-1 and the second image 2I-2 is 0.979.

Figure 17:
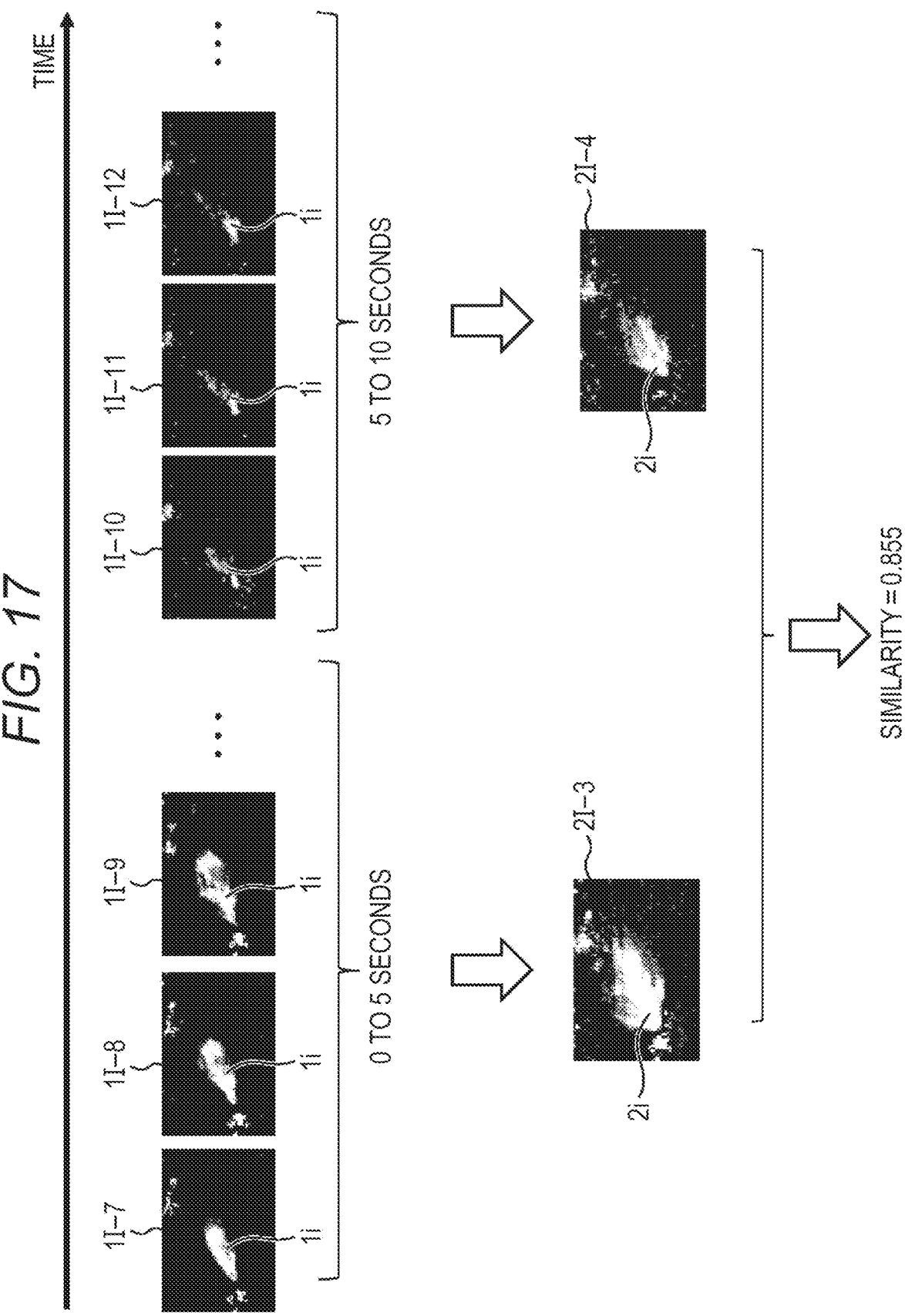
FIG. 17 is an explanatory view for describing a first image 1I and a second image 2I generated according to the first aspect of the embodiment, in a case where a gas has appeared.

FIG. 17 is an explanatory view for describing a first image 1I and a second image 2I generated according to the first aspect of the embodiment, in a case where a gas has appeared. Each first image 1I illustrated in FIG. 17 is a first image 1I acquired from each frame (each surveillance image) configuring a dynamic image for 10 seconds, as in FIG. 16.

A second image 2I-3 is a second image 2I generated by using a plurality of first images 1I (a first image 1I-7, a first image 1I-8, a first image 1I-9, and, . . . ) acquired from each frame (each surveillance image) configuring a dynamic image for 0 to 5 seconds. A second image 2I-4 is a second image 2I generated by using these first images 1I (a first image 1I-10, a first image 1I-11, a first image 1I-12, and, . . . ) acquired from each frame (each surveillance image) configuring a dynamic image for 5 to 10 seconds. The similarity between the second image 2I-3 and the second image 2I-4 is 0.855.

Figure 18:
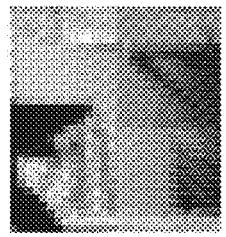
FIG. 18 is an image view illustrating an image cut out from an infrared image.

In the case where steam exists in the middle of the area from the light source to the reflective surface, the similarity will be described. The light source is the sun and the reflective surface is a surface of the tower. FIG. 18 is an image view illustrating an image 102 cut out from an infrared image. The image 102 contains a tower image. Steam exists in the middle of the area from the light source to the tower.

Figure 19:
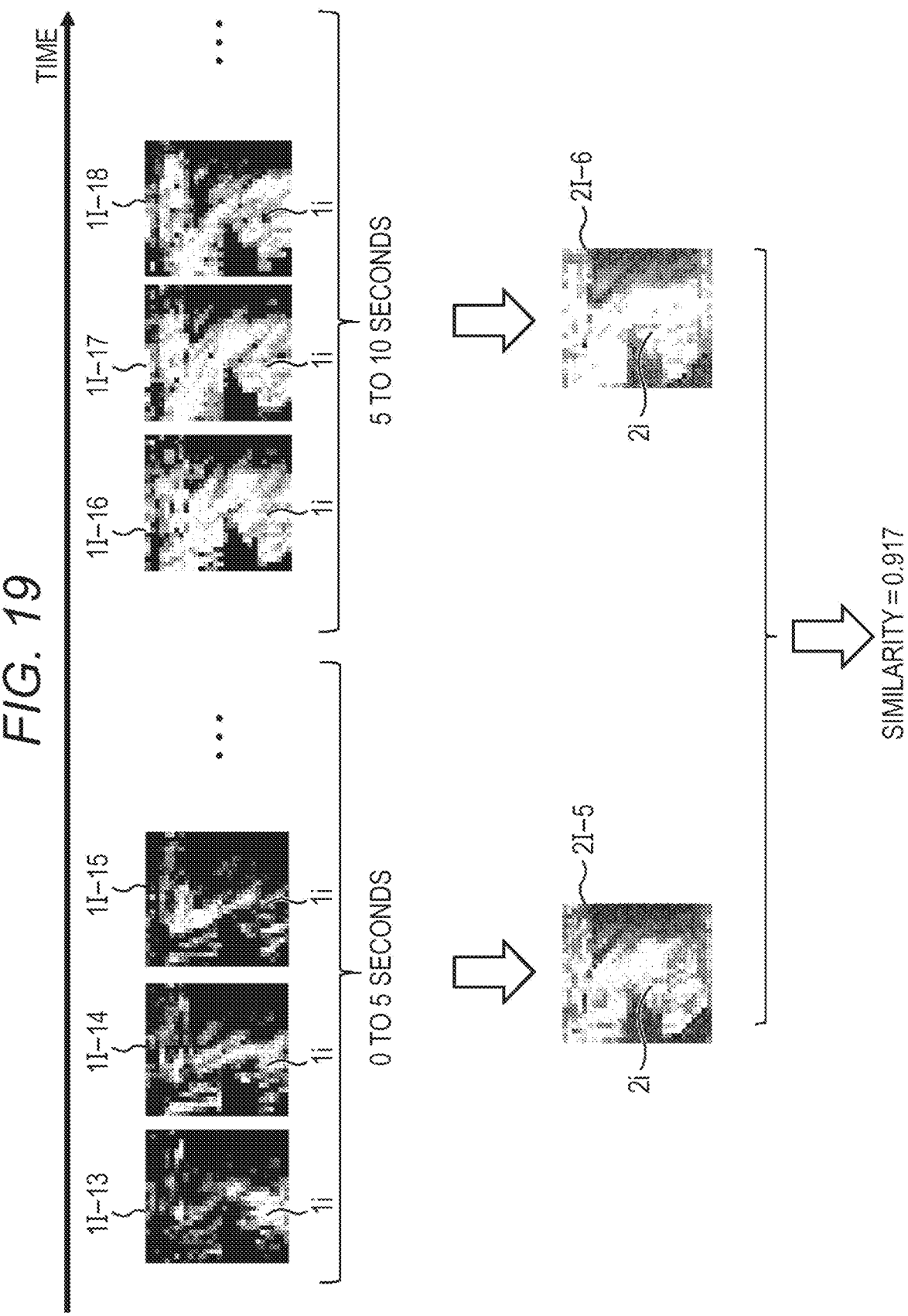
FIG. 19 is an explanatory view for describing a first image 1I and a second image 2I generated according to the first aspect of the embodiment, in a case where steam exists in the middle of an area from the light source to the reflective surface.

FIG. 19 is an explanatory view for describing the first image 1I and the second image 2I generated according to the first aspect of the embodiment, in a case where steam exists in the middle of area from the light source to the reflective surface. Each first image 1I illustrated in FIG. 19 is a first image 1I acquired from each frame (each surveillance image) configuring a dynamic image for 10 seconds, as in FIG. 16.

A second image 2I-5 is a second image 2I generated by using these first images 1I (a first image 1I-13, a first image 1I-14, a first image 1I-15, and, . . . ) acquired from each frame (each surveillance image) configuring a dynamic image for 0 to 5 seconds. A second image 2I-6 is a second image 2I generated by using these first images 1I (a first image 1I-16, a first image 1I-17, a first image 1I-18, and, . . . ) acquired from each frame (each surveillance image) configuring a dynamic image for 5 to 10 seconds. The similarity between the second image 2I-5 and the second image 2I-6 is 0.917.

With reference to FIGS. 16, 17 and 19, it can be seen that, in a case where a threshold value of the similarity is, for example, 0.900, it is possible to identify whether or not a gas candidate is a gas. By comparing the similarity with a threshold value (for example, 0.900), the determination unit 94 determines that the gas candidate is a non-gas, in a case where the similarity exceeds the threshold value, and determines that the gas candidate is a gas, in a case where the similarity is equal to or less than the threshold value (step S104).

As described above, according to the first aspect of the embodiment, since two second images 2I are generated and it is determined based on the similarity between these second images 2I whether or not a gas candidate is a gas, it is possible to improve the accuracy of gas detection.

Although lengths of two predetermined periods have been described with 5 seconds as an example, the lengths of two predetermined periods are not limited to 5 seconds (for example, 10 seconds). The lengths of the two predetermined periods may be the same or different.

Figure 20:
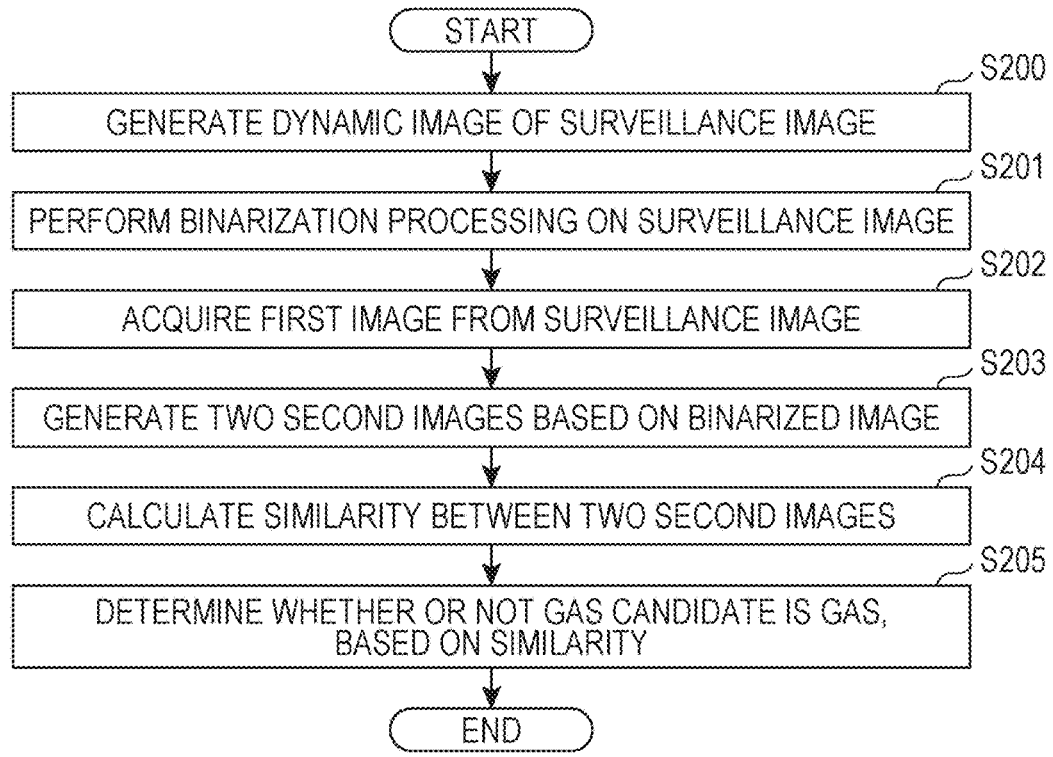
FIG. 20 is a flowchart of processing performed according to a second aspect of the embodiment.

The second aspect of the embodiment will be described. According to the second aspect of the embodiment, the second image 2I is generated by a method different from the first aspect of the embodiment. FIG. 20 is a flowchart of processing performed according to the second aspect of the embodiment. With reference to FIGS. 1A and 20, the first processing unit 91 generates a dynamic image of a surveillance image based on dynamic image data MD (step S200). This is the same as step S100 illustrated in FIG. 15.

Figure 21:
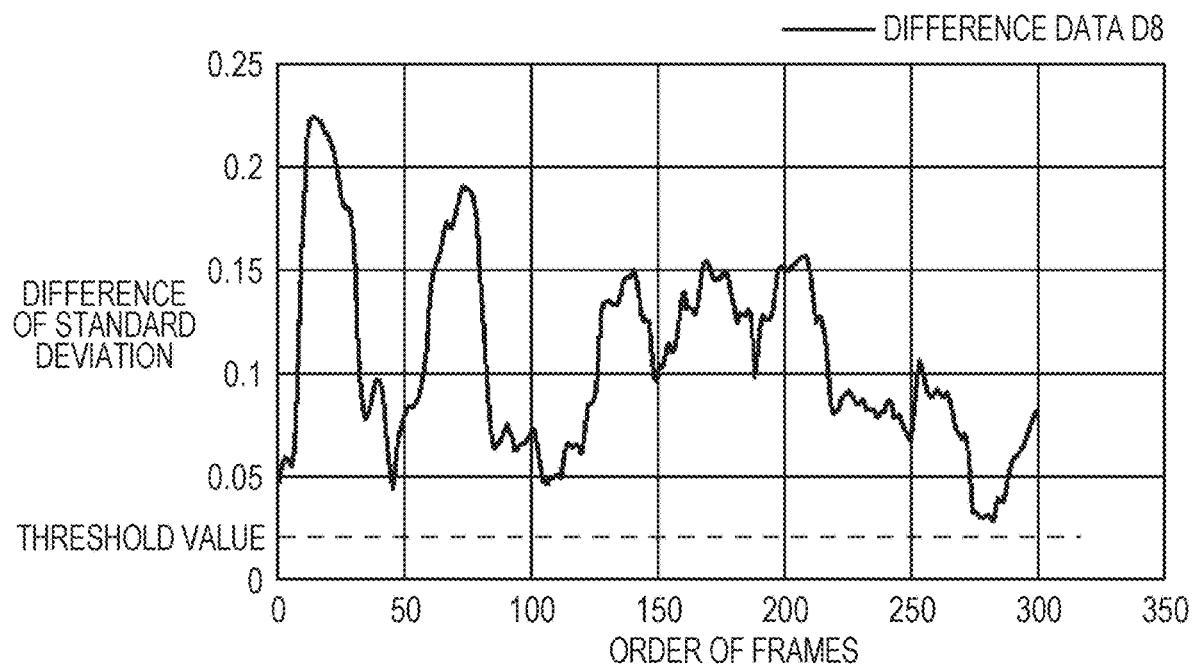
FIG. 21 is a graph in which a threshold value is added to the graph illustrated in FIG. 14.

The first processing unit 91 performs binarization processing of each frame (each surveillance image) configuring the dynamic image generated in step S200 (step S201). A threshold value used in this processing will be described. FIG. 21 is a graph obtained by adding the threshold value to the graph illustrated in FIG. 14. This graph is a graph illustrating change in the values of pixels corresponding to a position (point SP3) where a gas does not appear. This graph illustrates difference data D8. Since the frame rate is 30 fps, difference data D8 for 10 seconds is illustrated. The difference data D8 of this graph is always greater than 0.02. In this regard, herein, the threshold value of the binarization processing is set to 0.02.

Figure 22:
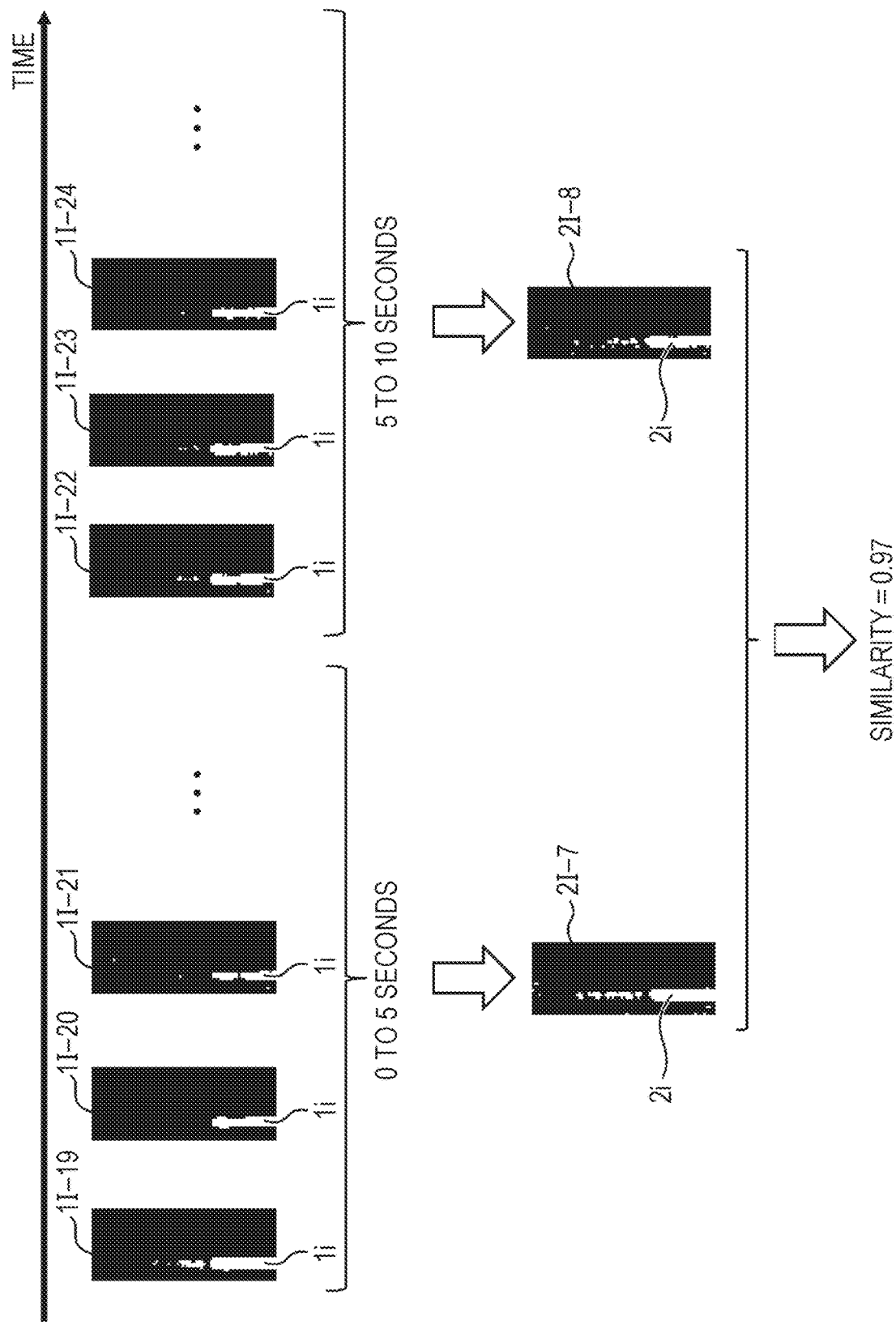
FIG. 22 is an explanatory view for describing a first image 1I and a second image 2I generated according to the second aspect of the embodiment, in a case where steam exists in the middle of the area from the heat source to the reflective surface.

It is considered that each frame (each binarized image) configuring the dynamic image subjected to the binarization processing in step S201 includes the first region image 1$i$ indicating a region where a gas candidate has appeared. FIG. 22 is an explanatory view for describing the first image 1I and the second image 2I generated according to the second aspect of the embodiment, in a case where steam exists in the middle of the area from the heat source to the reflective surface. The reflective surface is a surface of the tower.

The first processing unit 91 acquires the first image 1I from each frame (each binarized image) configuring a dynamic image for 10 seconds through the same processing as step S101 of the first aspect (step S202).

The second processing unit 92 generates two second images 2I-7 and 2I-8 (step S203). For example, the second processing unit 92 generates the second image 2I-7, by using a plurality of first images 1I (a first image 1I-19, a first image 1I-20, a first image 1I-21, and, . . . ) acquired from each frame (each binarized image) configuring a dynamic image for 0 to 5 seconds (a predetermined period). In detail, it is described that pixels configuring the first region image 1$i$ are set as white pixels, and the pixels other than this image are set as black pixels. In a case where at least one white pixel exists in the pixels in the same order in the plurality of first images 1I, the second processing unit 92 sets a pixel located in the above order in the second image 2I-7 as a white pixel. Specifically, it is described that, in a case where at least one white pixel exists among these first pixels in the plurality of first images 1I, the second processing unit 92 sets a first pixel in the second image 2I-7 as a white pixel. In a case where at least one white pixel exists among the second pixels in the plurality of first images 1I, the second processing unit 92 sets a second pixel in the second image 2I-7 as a white pixel. The second processing unit 92 performs the same processing on the third and subsequent pixels.

In this manner, once values of pixels configuring the second image 2I-7 are determined, it has been seen that an image included in the second image 2I-7 becomes an image (a second region image 2$i$) indicating a region where a gas candidate has appeared in at least a part of a predetermined period. This is also applicable to a second image 2I-8 to a second image 2I-10 to be described later.

For example, the second processing unit 92 generates the second image 2I-8, by using a plurality of first images 1I (a first image 1I-22, a first image 1I-23, a first image 1I-24, and, . . . ) acquired from each frame (each binarized image) configuring a dynamic image for 5 to 10 seconds (a predetermined period). Since the method of generating the second image 2I-8 is the same as the method of generating the second image 2I-7, the description thereof will not be repeated.

The calculation unit 93 calculates the similarity between the second image 2I-7 and the second image 2I-8 by using the equation 2 (step S204).

[Equation 2]

$$\text{Similarity} = \frac{\text{Number of matching pixels}}{\text{Number of all pixels}} \quad \text{(Equation 2)}$$

Equation 2 indicates a ratio in which the pixels located in the same order in the second image 2I-7 and the second image 2I-8 match. Equation 2 will be described in detail. The second image 2I is a binarized image. The calculation unit 93 determines whether or not the pixels located in the same order in the second image 2I-7 and the second image 2I-8 match. In a case where one pixel is a black pixel and the other pixel is a white pixel, the pixels do not match. The pixels located in this order are not matching pixels. In a case where both pixels are white pixels, the pixels match. The pixels located in this order are matching pixels. In a case where both pixels are black pixels, the pixels match. The pixels located in this order are matching pixels.

The number of all pixels in Equation 2 is the number of pixels of one second image 2I. The number of matching pixels is the total number of matching pixels. The similarity between the second image 2I-7 and the second image 2I-8 is 0.97.

Figure 23:
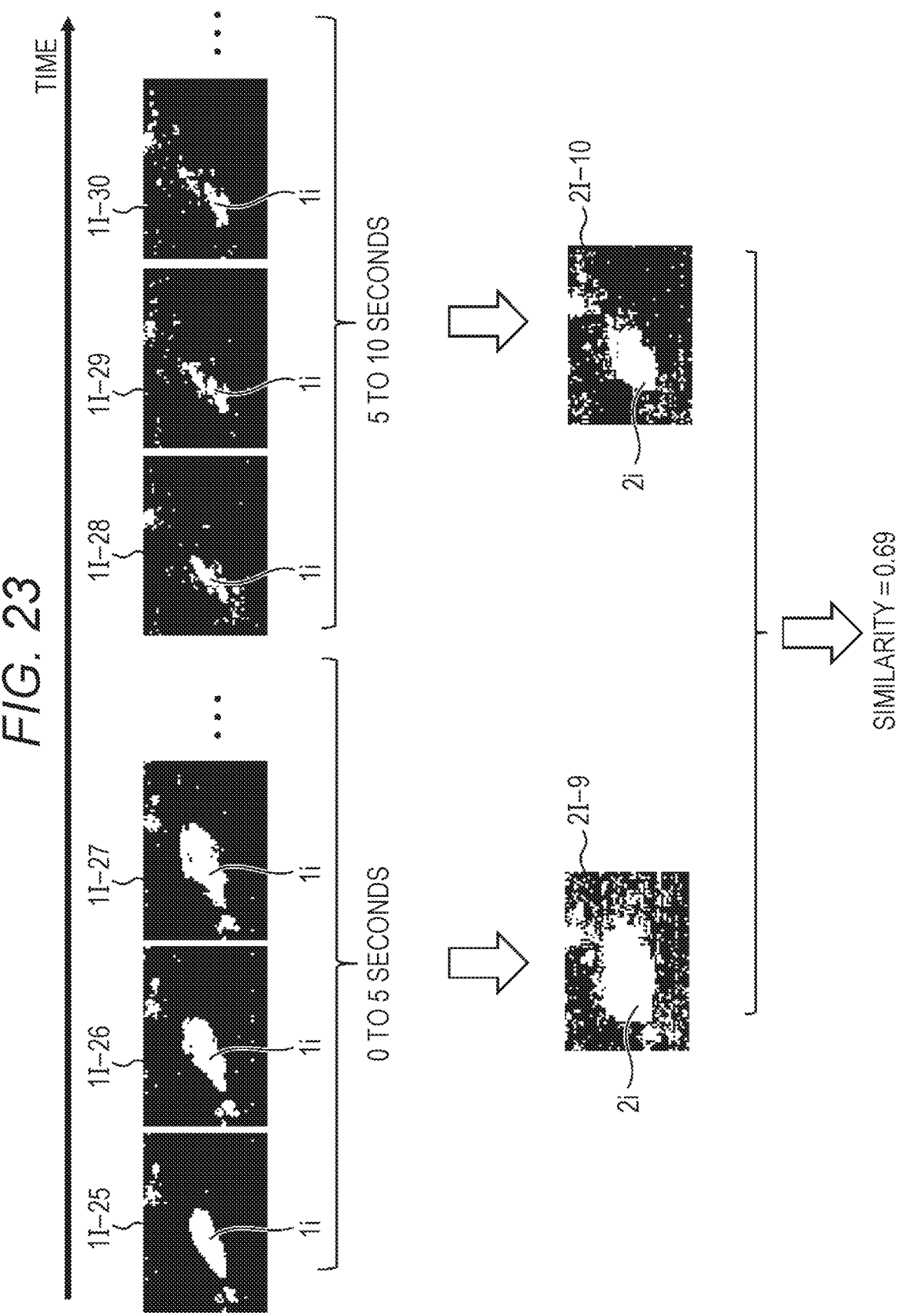
FIG. 23 is an explanatory view for describing a first image 1I and a second image 2I generated according to the second aspect of the embodiment, in a case where a gas has appeared.

FIG. 23 is an explanatory view for describing the first image 1I and the second image 2I generated according to the second aspect of the embodiment when a gas has appeared. Each first image 1I illustrated in FIG. 23 is a first image 1I acquired from each frame (each surveillance image) configuring a dynamic image for 10 seconds, as in FIG. 16.

A second image 2I-9 is a second image 2I generated by using a plurality of first images 1I (a first image 1I-25, a first image 1I-26, a first images 1I-27, and, . . . ) acquired from each frame (each binarized image) configuring a dynamic image for 0 to 5 seconds. A second image 2I-10 is a second image 2I generated by using these first images 1I (a first image 1I-28, a first image 1I-29, a first images 1I-30, and, . . . ) acquired from each frame (each binarized image) configuring a dynamic image for 5 to 10 seconds. The similarity between the second image 2I-9 and the second image 2I-10 is 0.69.

With reference to FIGS. 22 and 23, it can be seen that, in a case where a threshold value of the similarity is set to, for example, 0.90, it is possible to identify whether or not a gas candidate is a gas. By comparing the similarity with a threshold value (for example, 0.90), the determination unit 94 determines that the gas candidate is a non-gas, in a case where the similarity exceeds the threshold value, and determines that the gas candidate is a gas, in a case where the similarity is equal to or less than the threshold value (step S205).

Although the similarity is calculated using Equation 2 according to the second aspect of the embodiment, the similarity may be calculated using Equation 1.

The third aspect of the embodiment will be described. The first aspect and the second aspect of the embodiment determine that a gas candidate is a non-gas, in a case where the similarity of these second images 2I exceeds the threshold value. The third aspect performs the following determination processing in addition to the similarity, in order to further increase the accuracy of determining whether or not a gas candidate is a gas.

Figure 24:
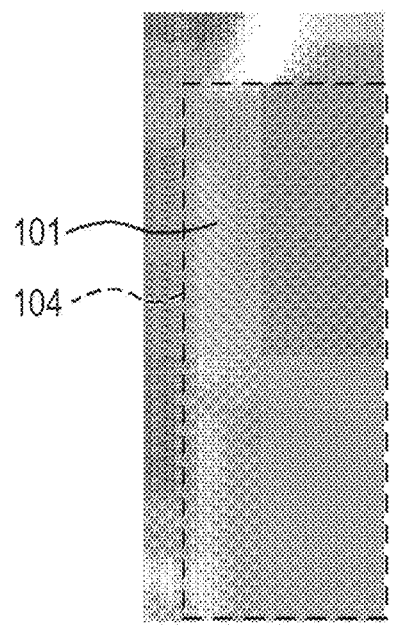
FIG. 24 is an image view illustrating an infrared image in which a range of the reflective surface is set.
Figure 25:
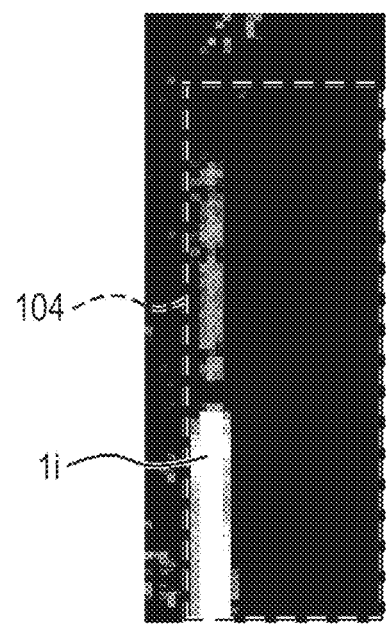
FIG. 25 is an image view illustrating a first image 1I generated from the infrared image illustrated in FIG. 24.

With reference to FIG. 1, the input unit 12 functions as a second input unit. The user operates the input unit 12 to preset, as the infrared image, a range of the reflective surface that may reflect at least one of light and heat. The reflective surface is, for example, a surface of the tower. FIG. 24 is an image view illustrating an infrared image 103 in which a range 104 of the reflective surface is set. The range 104 of the reflective surface is set in the infrared image. The range 104 of the reflective surface is set in each frame configuring the dynamic image indicated by the dynamic image data MD (set in each infrared image). FIG. 25 is an image view illustrating a first image 1I generated from the infrared image 103 illustrated in FIG. 24.

The determination unit 94 determines whether or not the first region image 1i included in the first image 1I protrudes from the range 104 of the reflective surface. The determination unit 94 determines based on whether or not the first region image 1i protrudes from the range 104 of the reflective surface and the similarity of these second images 2I, whether or not a gas candidate is a gas. The similarity may be the similarity calculated in the first aspect (step S103 in FIG. 15) or the similarity calculated in the second aspect (step S204 in FIG. 20).

In a case of a gas, even though the fluctuation of the gas is small, there is a possibility that the first region image 1i exceeds the range 104 of the reflective surface. In the case of reflection, the first region image 1i does not exceed the range 104 of the reflective surface. Therefore, in a case where the first region image 1i exceeds the range 104 of the reflective surface, there is a possibility that a gas candidate is a gas.

Since, in a case where the fluctuation of the gas is small, the similarity of these second images 2I is relatively high, it is difficult to identify based on only the similarity of these second images 2I whether or not a gas candidate is a gas. In this regard, in the third aspect of the embodiment, it is determined whether or not a gas candidate is a gas, based on the similarity of these second images 2I and whether or not the first region image 1i protrudes from the range 104 of the reflective surface. Therefore, according to the third aspect of the embodiment, it is possible to further improve the accuracy of gas detection.

A surveillance period (in other words, the number of first images for which it is determined whether or not the first region image 1i exceeds the range 104 of the reflective surface) in which the determination unit 94 surveils whether or not the first region image 1i exceeds the range 104 of the reflective surface is optional. For example, the determination unit 94 may set the surveillance period in parallel with two predetermined periods (0 to 5 seconds, and 5 to 10 seconds). In this case, the surveillance period is 10 seconds. The longer the surveillance period, the higher the accuracy of distinction between a gas with small fluctuation and the reflection may be. This is because, with a short surveillance time, there is a possibility that the first region image 1i does not exceed the range 104 of the reflective surface even though a gas has appeared.

Also, when the similarity of these second images 2I exceeds the threshold value and the first region image 1i does not exceed the range 104 of the reflective surface in the surveillance period of 10 seconds, the determination unit 94 determines that the gas candidate is highly likely to be generated due to the reflection. Then, when the first region image 1i does not exceed the range 104 of the reflective surface in a period (for example, one minute) longer than the surveillance period, the determination unit 94 may confirm that the gas candidate is generated due to the reflection.

Combination of Embodiments

A gas detection-use image processing device according to the first aspect of the embodiment includes: a first processing unit that performs first processing of acquiring a first image including a first region image indicating a region where a gas candidate has appeared, extracted from a predetermined region of an infrared image, on each of a plurality of the infrared images captured in time series in a predetermined period to acquires a plurality of the first images; and a second processing unit that performs second processing of generating a second image including a second region image indicating a region where the gas candidate has appeared in at least a part of the predetermined period, by using the plurality of first images. The first processing unit performs the first processing on the plurality of infrared images captured in time series in each of two or more of the predetermined periods. The second processing unit performs the second processing on the plurality of first images generated corresponding to each of the two or more predetermined periods to generate two or more of the second images. The gas detection-use image processing device according to the first aspect of the embodiment further includes: a determination unit that determines based on the similarity of the two or more second images whether or not the gas candidate is a gas.

The first region image is generated not only a case where a gas has appeared, but also in the case of the aforementioned (1) to (4) (for example, a case where steam or the like exists in the middle of the area from the heat source to the reflective surface).

The second region image included in the second image is an image illustrating a region where a gas candidate has appeared in at least a part of a predetermined period. When a predetermined period is set to, for example, 5 seconds, at least a part of the predetermined period may be the entire predetermined period (for example, 5 seconds), or may be a part (for example, one second) of the predetermined period.

The inventor has found that, in the case where a gas has appeared, the similarity between these second images is relatively low, and in a case caused by (1) to (4), the similarity between these second images is relatively high. In detail, it is described that in a case where the reflection caused by the above (1) to (4) has occurred in the predetermined period, once comparison between individual times in the predetermined period is performed, reflected positions are different. That is, in a case where the first region image caused by (1) to (4) is generated, the similarity between these first images is relatively low. Once comparison between the entire predetermined periods is performed, the reflected positions are similar. That is, in the case of (1) to (4), the similarity between these second images is relatively high.

A gas fluctuates irregularly. In the case where a gas has appeared in a predetermined period, once comparison between individual times in the predetermined period is performed, positions where a gas has appeared are different. That is, in a case where the first region image caused by the appearance of the gas is generated, the similarity between these first images is relatively low. This is similar to the case of reflection. Once comparison between the entire predetermined periods is performed, positions where a gas has appeared are dissimilar. That is, in the case where a gas has appeared, the similarity between these second images is relatively low.

The determination unit determines whether or not a gas candidate is a gas, based on the similarity of two or more second images. For example, in a case of two second images being provided, the determination unit determines that the gas candidate is a non-gas, in a case where the similarity of two second images exceeds a predetermined threshold value, and determines that the gas candidate is a gas, in a case where the similarity is equal to or less than the predetermined threshold value. For example, in a case of three or more second image being provided, the determination unit determines that the gas candidate is a non-gas, in a case where, by using one second image as a reference image, the similarity between the reference image and any one of the remaining second images exceeds the threshold value, and determines that the gas candidate is a gas, in a case where at least one of the similarity of these images is equal to or less than a predetermined threshold value.

As described above, since, according to the gas detection-use image processing device in the first aspect of the embodiment, two or more second images are generated and it is determined based on the similarity of these second images whether or not the gas candidate is a gas, it is possible to improve the accuracy of gas detection.

Two or more predetermined periods may be continuous (for example, one predetermined period is from 0 to 5 seconds, and another predetermined period is from 5 seconds to 10 seconds) or may be separated (for example, one predetermined period is from 0 to 5 seconds, and another predetermined period is from 10 seconds to 15 seconds), and a part thereof may overlap (for example, one predetermined period is from 0 to 5 seconds, and another predetermined period is from 3 seconds to 8 seconds).

There are various methods of representing the similarity. For example, the determination unit may calculate the similarity using the normalized cross correlation, or calculates a ratio at which pixels located in the same order match in binarized two or more second images, as the similarity.

In the configuration, the first processing unit performs extraction processing of extracting the first region image on the infrared image, and sets the predetermined region including the first region image in the infrared image subjected to the extraction processing to acquire the predetermined region as the first image.

In this configuration, a first region image (that is, an image illustrating a region where a gas candidate has appeared) is extracted from the entire infrared image. The method of extracting the first region image is not limited thereto, and the processing of extracting the first region image may be performed on a part of the infrared image. This is indicated as below.

In the configuration, there is further provided a first input unit, and when the first input unit is operated to set the predetermined region in the infrared image, the first processing unit performs extraction processing of extracting the first region image on the predetermined region to acquire the predetermined region subjected to the extraction processing as the first image.

This configuration is applied when a position where a gas is highly likely to appear is known in advance. According to this configuration, since the processing of extracting the first region image is not performed on the entire infrared image, but the processing of extracting the first region image is performed on a predetermined region set in the infrared image, it is possible to reduce an amount of image processing.

In the configuration, the second processing unit sets a maximum value of values indicated by pixels located in the same order in the plurality of first images, as a value of a pixel located in the order in the second image to generate the second image.

The second image generated by this configuration is a first example of a second image. For example, when the maximum value of the values of these first pixels in the plurality of first images is 0.2, the value of the first pixel in the second image is 0.2. The values of the remaining pixels of the second image are similarly determined. In this manner, once values of the pixels configuring the second image are determined, it has been seen that an image included in the second image becomes an image (a second region image) illustrating a region where a gas candidate has appeared in at least a part of a predetermined period.

In the configuration, the second processing unit sets pixels exceeding a predetermined threshold value in the plurality of first images, as pixels configuring the second region image to generate the second image.

The second image generated by this configuration is a second example of the second image. For example, it is considered that the plurality of first images are binarized and the first region image is configured with white pixels. When at least one of pixels located in the same order in a plurality of first images is a white pixel, a pixel located in the order in the second image is a white pixel. The second region image is configured by white pixels among pixels configuring the second image. In this manner, once values of the pixels configuring the second image are determined, it has been seen that an image included in the second image becomes an image (a second region image) illustrating a region where a gas candidate has appeared in at least a part of a predetermined period.

In the configuration, there is further provided a second input unit, and when the second input unit is operated to set a range of a reflective surface that may reflect at least one of light and heat in the plurality of infrared images, the determination unit determines whether or not the first region image included in the first image protrudes from the range, and the determination unit determines whether or not the gas candidate is a gas, based on presence or absence of protrusion from the range and the similarity.

In this configuration, the user presets the range of the reflective surface that may reflect at least one of light and heat, as the infrared image. This range is, for example, a range of a tower image, or a range of a piping image. In the case of a gas, even though the fluctuation of the gas is small, there is a possibility that the first region image exceeds a range of the reflective surface. In the case of reflection, the first region image does not exceed the range of the reflective surface. Therefore, in a case where the first region image exceeds the range of the reflective surface, there is a possibility that a gas candidate may be a gas.

Since, in a case where the fluctuation of the gas is small, the similarity of these second images is relatively high, it is difficult to identify based on only the similarity of these second images whether or not a gas candidate is a gas. In this regard, in this configuration, it is determined whether or not a gas candidate is a gas, based on the similarity of these second images and whether or not the first region image protrudes from the range of the reflective surface. Therefore, according to this configuration, it is possible to further enhance the accuracy of gas detection.

A gas detection-use image processing method according to a second aspect of the embodiment includes: a first processing step of performing first processing of acquiring a first image including a first region image indicating a region where a gas candidate has appeared, extracted from a predetermined region of an infrared image, on each of a plurality of the infrared images captured in time series in a predetermined period to acquire a plurality of the first images; and a second processing step of performing second processing of generating a second image including a second region image indicating a region where the gas candidate has appeared in at least a part of the predetermined period, by using the plurality of first images. In the first processing step, the first processing is performed on a plurality of the infrared images captured in time series in each of two or more of the predetermined periods. In the second processing step, the second processing is performed on a plurality of first images generated corresponding to each of the two or more predetermined periods to generate two or more of the second images. The gas detection-use image processing method according to the second aspect of the embodiment further includes: a determination step of determining based on the similarity of the two or more second images whether or not the gas candidate is a gas.

In the gas detection-use image processing method according to the second aspect of the embodiment, the gas detection-use image processing device according to the first aspect of the embodiment is defined from the viewpoint of a method, and the same effects as those of the gas detection-use image processing device according to the first aspect of the embodiment are obtained.

A gas detection-use image processing program according to a third aspect of the embodiment causes a computer to execute: a first processing step of performing first processing of acquiring a first image including a first region image indicating a region where a gas candidate has appeared, extracted from a predetermined region of an infrared image, on each of a plurality of the infrared images captured in time series in a predetermined period to acquires a plurality of the first images; and a second processing step of performing second processing of generating a second image including a second region image indicating a region where the gas candidate has appeared in at least a part of the predetermined period, by using the plurality of first images. In the first processing step, the first processing is performed on a plurality of the infrared images captured in time series in each of two or more of the predetermined periods. In the second processing step, the second processing is performed on a plurality of first images generated corresponding to each of the two or more predetermined periods to generate two or more of the second images. The gas detection-use image processing program according to the third aspect of the embodiment further causes a computer to further execute: a determination step of determining based on the similarity of the two or more second images whether or not the gas candidate is a gas.

In the gas detection-use image processing program according to the third aspect of the embodiment, the gas detection-use image processing device according to the first aspect of the embodiment is defined from the viewpoint of a program, and the same effects as those of the gas detection-use image processing device according to the first aspect of the embodiment are obtained.

The gas detection-use image processing device according to the first aspect of the embodiment may include a calculation unit that calculates similarity of the two or more second images, instead of the determination unit. The same applies to the gas detection-use image processing method according to the second aspect of the embodiment and the gas detection-use image processing program according to the third aspect of the embodiment.

Although embodiments of the present invention have been illustrated and described in detail, these are merely an illustration and example and not limited thereto. The scope of the present invention should be interpreted by the terms of the accompanying claims.

There is disclosed Japanese Patent Application No. 2016-252269 filed on Dec. 27, 2016, including the specification, claims, drawings and abstract, the entire of which is incorporated herein by reference in its entirety.

INDUSTRIAL APPLICABILITY

According to the present invention, it is possible to provide a gas detection-use image processing device, a gas detection-use image processing method, and a gas detection-use image processing program.

The invention claimed is:

1. A gas detection-use image processing device comprising:
   a memory; and
   a processor which executes a program stored in the memory to perform operations comprising:
   performing first processing to acquire a plurality of first images each including a first region corresponding to a gas candidate, wherein the first processing comprises extracting the plurality of first images from a plurality of infrared images captured in time series in at least two predetermined time periods, such that the plurality of first images comprise a first set of a plurality of first images corresponding to one of the predetermined time periods and a second set of a plurality of first images corresponding to another one of the predetermined time periods;
   performing second processing to generate at least two second images each including a second region related to the gas candidate by using the plurality of first images, wherein the at least two second images comprise one second image generated by using the first set of the plurality of first images corresponding to said one of the predetermined time periods and another second image generated by using the second set of the plurality of first images corresponding to said another one of the predetermined time periods;
   determining a similarity of the at least two second images; and
   determining whether the gas candidate is a gas based on the determined similarity of the at least two second images.

2. The gas detection-use image processing device according to claim 1, wherein the first processing comprises, for each of the plurality of infrared images, extracting the first region from the infrared image, setting a predetermined region including the first region in the infrared image, and acquiring the predetermined region as one of the first images.

3. The gas detection-use image processing device according to claim 2, wherein the second processing comprises:
  setting a maximum value of values indicated by pixels located in the same position in each image of the first set of the plurality of first images as a value of a pixel located in the same position in said one second image to generate said one second image; and
  setting a maximum value of values indicated by pixels located in the same position in each image of the second set of the plurality of first images as a value of a pixel located in the same position in said another second image to generate said another second image.

4. The gas detection-use image processing device according to claim 2, wherein the second processing comprises:
  setting pixels exceeding a predetermined threshold value in the first set of the plurality of first images, as pixels configuring the second region to generate said one second image; and
  setting pixels exceeding the predetermined threshold value in the second set of the plurality of first images, as pixels configuring the second region to generate said another second image.

5. The gas detection-use image processing device according to claim 2, wherein the similarity between the at least two second images is determined using normalized cross correlation.

6. The gas detection-use image processing device according to claim 2, wherein the at least two second images are binarized images, and the similarity between the at least two second images is determined by calculating a ratio in which pixels located in the same position match in the at least two of the second images.

7. The gas detection-use image processing device according to claim 1, wherein the operations performed by the processor further comprise receiving an input to set a predetermined region in the plurality of infrared images; and
  wherein the first processing comprises, for each of the plurality of infrared images, extracting the first region from the predetermined region and acquiring the predetermined region as one of the first images.

8. The gas detection-use image processing device according to claim 7, wherein the second processing comprises:
  setting a maximum value of values indicated by pixels located in the same position in each image of the first set of the plurality of first images as a value of a pixel located in the same position in said one second image to generate said one second image; and
  setting a maximum value of values indicated by pixels located in the same position in each image of the second set of the plurality of first images as a value of a pixel located in the same position in said another second image to generate said another second image.

9. The gas detection-use image processing device according to claim 7, wherein the second processing comprises:
  setting pixels exceeding a predetermined threshold value in the first set of the plurality of first images, as pixels configuring the second region to generate said one second image; and
  setting pixels exceeding the predetermined threshold value in the second set of the plurality of first images, as pixels configuring the second region to generate said another second image.

10. The gas detection-use image processing device according to claim 7, wherein the similarity between the at least two second images is determined using normalized cross correlation.

11. The gas detection-use image processing device according to claim 7, wherein the at least two second images are binarized images, and the similarity between the at least two second images is determined by calculating a ratio in which pixels located in the same position match in the at least two of the second images.

12. The gas detection-use image processing device according to claim 1, wherein the second processing comprises:
  setting a maximum value of values indicated by pixels located in the same position in each image of the first set of the plurality of first images as a value of a pixel located in the same position in said one second image to generate said one second image; and
  setting a maximum value of values indicated by pixels located in the same position in each image of the second set of the plurality of first images as a value of a pixel located in the same position in said another second image to generate said another second image.

13. The gas detection-use image processing device according to claim 1, wherein the second processing comprises:
  setting pixels exceeding a predetermined threshold value in the first set of the plurality of first images, as pixels configuring the second region to generate said one second image; and
  setting pixels exceeding the predetermined threshold value in the second set of the plurality of first images, as pixels configuring the second region to generate said another second image.

14. The gas detection-use image processing device according to claim 1, wherein the similarity between the at least two second images is determined using normalized cross correlation.

15. The gas detection-use image processing device according to claim 1, wherein the at least two second images are binarized images, and the similarity between the at least two second images is determined by calculating a ratio in which pixels located in the same position match in the at least two of the second images.

16. The gas detection-use image processing device according to claim 1, wherein the operations performed by the processor further comprise:
  receiving an input that sets a range of a reflective surface that may reflect at least one of light and heat in the plurality of infrared images,
  determining whether the first region included in the first images protrudes from the range; and
  determining whether the gas candidate is a gas, based on the similarity and whether the first region protrudes from the range.

17. A gas detection-use image processing method comprising:
  performing first processing to acquire a plurality of first images each including a first region corresponding to a gas candidate, wherein the first processing comprises extracting the plurality of first images from a plurality of infrared images captured in time series in at least two predetermined time periods, such that the plurality of first images comprise a first set of a plurality of first images corresponding to one of the predetermined time periods and a second set of a plurality of first images corresponding to another one of the predetermined time periods;
  performing second processing to generate at least two second images each including a second region related to the gas candidate by using the plurality of first images, wherein the at least two second images comprise one second image generated by using the first set of the plurality of first images corresponding to said one of the predetermined time periods and another second image generated by using the second set of the plurality of first images corresponding to said another one of the predetermined time periods;

determining a similarity of the at least two second images; and determining whether the gas candidate is a gas based on the determined similarity of the at least two second images.

18. A non-transitory recording medium storing a computer readable gas detection-use image processing program that causes a computer to execute functions comprising:

performing first processing to acquire a plurality of first images each including a first region corresponding to a gas candidate, wherein the first processing comprises extracting the plurality of first images from a plurality of infrared images captured in time series in at least two predetermined time periods, such that the plurality of first images comprise a first set of a plurality of first images corresponding to one of the predetermined time periods and a second set of a plurality of first images corresponding to another one of the predetermined time periods;

performing second processing to generate at least two second images each including a second region related to the gas candidate by using the plurality of first images, wherein the at least two second images comprise one second image generated by using the first set of the plurality of first images corresponding to said one of the predetermined time periods and another second image generated by using the second set of the plurality of first images corresponding to said another one of the predetermined time periods;

determining a similarity of the at least two second images; and determining whether the gas candidate is a gas based on the determined similarity of the at least two second images.

* * * * *